(12) United States Patent
Salvi et al.

(10) Patent No.: US 10,303,255 B2
(45) Date of Patent: May 28, 2019

(54) METHOD AND APPARATUS FOR UNIFIED FREE SPACE POSE INPUT SYSTEM NAVIGATION

(71) Applicant: Atheer, Inc., Mountain View, CA (US)

(72) Inventors: Ganesh Salvi, Santa Clara, CA (US);
Neeraj Kulkarni, Sunnyvale, CA (US);
Yu-Hsiang Chen, Cupertino, CA (US)

(73) Assignee: Atheer, Inc., Santa Clara, CA (US)

( * ) Notice: Subject to any disclaimer, the term of this patent is extended or adjusted under 35 U.S.C. 154(b) by 213 days.

(21) Appl. No.: 15/169,594

(22) Filed: May 31, 2016

(65) Prior Publication Data

US 2017/0344122 A1    Nov. 30, 2017

(51) Int. Cl.
| G06F 3/041 | (2006.01) |
| G06F 3/01 | (2006.01) |
| G06F 3/0485 | (2013.01) |
| G06F 3/038 | (2013.01) |
| G06F 3/00 | (2006.01) |
| G06F 3/0483 | (2013.01) |

(52) U.S. Cl.
CPC .............. *G06F 3/017* (2013.01); *G06F 3/005* (2013.01); *G06F 3/038* (2013.01); *G06F 3/0483* (2013.01); *G06F 3/0485* (2013.01)

(58) Field of Classification Search
CPC ........................................................ G06F 3/038
USPC ........................................................ 345/173
See application file for complete search history.

(56) References Cited

U.S. PATENT DOCUMENTS

2008/0036743 A1*    2/2008    Westerman ............. G06F 3/038
                                                                345/173

* cited by examiner

*Primary Examiner* — Abdul-Samad A Adediran
(74) *Attorney, Agent, or Firm* — Mohr IP Law Solutions, PC

(57) ABSTRACT

A single pose is used in multiple postures to deliver at least a minimal core set of free space gestures for navigating within an interface, so as to be intuitive to users, easily remembered, straightforward for developers, and clearly defined for processing. A "thumb-extended" pose with fingers together and clenched and thumb extended and raised is oriented in four cardinal directions so as to manifest four distinct postures: right, left, up, and down. Thumb-right and thumb left invoke scrolling forward and scrolling back, respectively, and thumb-up and thumb-down invoke yes and no respectively.

26 Claims, 16 Drawing Sheets

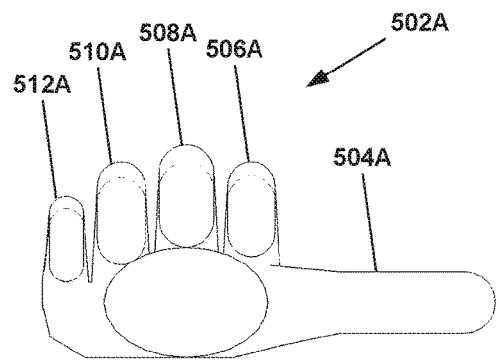
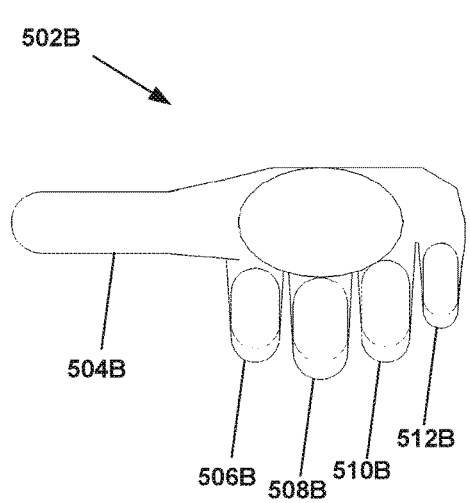
FIG. 5A
FIG. 5B
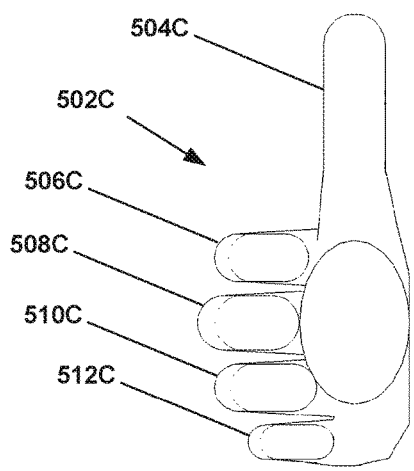
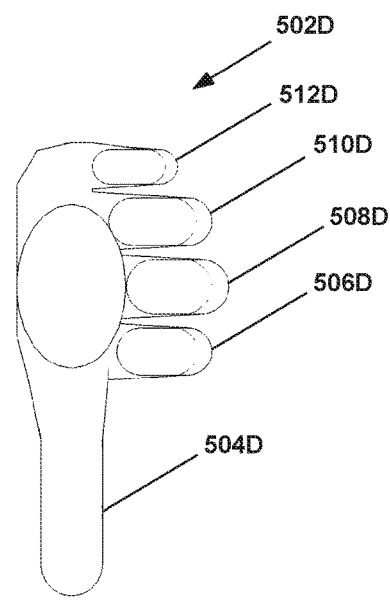
FIG. 5C
FIG. 5D

METHOD AND APPARATUS FOR UNIFIED FREE SPACE POSE INPUT SYSTEM NAVIGATION

FIELD OF THE INVENTION

The disclosure relates to navigating within and/or controlling systems with free space pose input. The disclosure relates more particularly using a single free space pose in several different postures, wherein each posture calls a different function, so as to enable control of an electronic device or other system

DESCRIPTION OF RELATED ART

Input to a system may be delivered in a variety of manners. For example, free space inputs—inputs not constrained to a surface such as a mouse pad, touch screen, etc.—may be delivered with a human hand, stylus, etc. Such inputs then may be sensed, with responses carried out based on the hand inputs (or stylus inputs, etc.).

Certain types of interface may facilitate a very large number of unique individual inputs, for example e.g. 100 or more keys for certain desktop PCs, a nearly-unlimited number of potential text commands, etc. However, free space inputs may in at least certain circumstances have a more limited range of unique inputs available, or at least a more limited range of inputs that are useful in practice. For example, even though extending an index finger while leaving other fingers clenched may be straightforward for many individuals, similarly extending a ring finger while leaving other fingers clenched may be much more difficult. In addition, certain inputs may be difficult to identify from sensor data, e.g. the index and middle finger extended while held together may, to certain sensors and from certain angles, exhibit an appearance similar to an index finger extended alone.

In principle, it may be possible to provide a greater number of available inputs by considering degrees of variation. For example, several degrees of extension of an index finger could each be assigned different meanings (e.g. calling different commands). Potentially, this could provide for very large number of possible free space hand inputs. However, doing so could raise issues of definition and discrimination in recognizing the inputs (for example, determining whether the index finger is fully extended, half extended, quarter extended, etc.), and could also serve to confuse users (who would have to remember the difference between what a fully extended index finger means versus a half extended index finger).

BRIEF SUMMARY OF THE INVENTION

The embodiments are directed to a variety of systems, apparatus, methods, and paradigms for using poses in varying postures for integrated system control and/or navigation.

In one embodiment, a method is provided that includes instantiating a forward interface navigation function including a forward scrolling of content in a processor, instantiating a back interface navigation function including a backward scrolling of the content opposed to the positive scrolling in the processor, instantiating an affirmative interface navigation function including a logical affirmative in the processor, and instantiating a negative interface navigation function including a logical negative opposed to the logical affirmative in the processor. The method includes defining a substantially horizontal geometric directional axis in the processor, and defining a substantially vertical geometric directional axis in the processor. The method also includes instantiating a forward posture input standard associated with the forward interface navigation function in the processor, specifying a free space hand pose including fingers substantially together and substantially clenched and thumb substantially extended and substantially raised, with the hand pose being disposed in forward posture with the thumb oriented substantially rightward along the horizontal axis, instantiating a back posture input standard associated with the back interface navigation function in the processor, specifying the hand pose disposed in a back posture with the thumb oriented substantially leftward along the horizontal axis, instantiating an affirmative posture input standard associated with the affirmative interface navigation function in the processor, specifying the hand pose disposed in an affirmative posture with the thumb oriented substantially upward along the vertical axis, and instantiating a negative posture input standard associated with the negative interface navigation function in the processor, specifying the hand pose disposed in a negative posture with the thumb oriented substantially downward along the vertical axis. The method further includes sensing a free space hand posture input in a sensor in communication with the processor. If the free space hand posture input satisfies the forward posture input standard, the method includes executing in the processor the forward interface navigation function so as to forward scroll the content. If the free space hand posture input satisfies the back posture input standard, the method includes executing in the processor the back interface navigation function so as to backward scroll the content. If the free space hand posture input satisfies the affirmative posture input standard, the method includes executing in the processor the affirmative interface navigation function so as to indicate the logical affirmative. If the free space hand posture input satisfies the negative posture input standard, the method includes executing in the processor the negative interface navigation function so as to indicate the logical negative. In such manner, the method enables system navigation control with the free space hand posture input.

In another embodiment, a method is provided that includes establishing a first control function including a positive parameter progression, establishing a second control function including a negative parameter progression opposed to the positive parameter progression, establishing a third control function including a first logical binary state, and establishing a fourth control function including a second logical binary state opposed to the first logical binary state. The method includes establishing a first axis, and establishing a second axis. The method also includes establishing a first input standard associated with the first control function and specifying a pose disposed in a first posture oriented substantially in a first direction along the first axis, establishing a second input standard associated with the second control function and specifying the pose disposed in a second posture oriented substantially in a second direction along the first axis, establishing a third input standard associated with the third control function and specifying the pose disposed in a third posture substantially in a third direction along the second axis, and establishing a fourth input standard associated with the fourth control function and specifying the pose disposed in a fourth posture oriented substantially in a fourth direction along the second axis. The method includes sensing a posture input. The method includes executing the first control function so as to positively progress the parameter if the posture input satisfies the first input standard, executing the second control function so as to negatively progress the parameter if the posture input satisfies the second input standard, executing the third control function so as to indicate the first logical binary state if the posture input satisfies the third input standard, and executing the fourth control function so as to indicate the second logical binary state if the posture input satisfies the fourth input standard. In such manner, the method enables control with the posture input.

The parameter may be discrete. The parameter may be continuous.

The parameter may include a spatial position, a numeric position, a magnitude, and/or a time.

The parameter may include a spatial position within a continuous range of content, with positive parameter progression including forward scrolling the content negative parameter progression including backward scrolling content.

The parameter may include a numeric position within a discrete range of content, with the positive parameter progression including forward incrementing the content the negative parameter progression including backward incrementing the content.

The first logical binary state may include a logical affirmative, and the second logical binary state may include a logical negative.

The first and second directional axes may be geometric axes. The first and second directional axes may be substantially perpendicular. The first geometric direction axis may be substantially horizontal, and the second geometric directional axis may be substantially vertical.

The pose may be a free space pose. The pose may be a hand pose.

The pose may be a free space hand pose, the pose including fingers substantially together and substantially clenched and thumb substantially extended and substantially raised, with the direction of the thumb defining the orientation of the pose for the posture thereof; fingers and thumb substantially together and substantially extended, with the direction of the fingers and the thumb defining the orientation of the pose for the posture thereof; thumb, middle, index, and pinkie fingers substantially together and substantially clenched and index finger substantially extended, with the direction of the index finger defining the orientation of the pose for the posture thereof; and/or fingers and thumb substantially together and substantially clenched to form a fist, with the direction of the first defining the orientation of the pose for the posture thereof.

In another embodiment, a method is provided that includes establishing a first control function including a positive parameter progression, and establishing a second control function including a negative parameter progression opposed to the positive parameter progression. The method includes establishing a directional axis. The method also includes establishing a first input standard associated with the first control function, specifying a pose disposed in a first posture oriented substantially in a first direction along the axis, and establishing a second input standard associated with the second control function, specifying the pose disposed in a second posture oriented substantially in a second direction along the axis. The method includes sensing a posture input. The method further includes executing the first control function so as to positively progress the parameter if the posture input satisfies the first input standard, and executing the second control function so as to negatively progress the parameter if the posture input satisfies the second input standard. In such manner, method enables control with the posture input The parameter may be discrete. The parameter may be continuous.

The parameter may include a spatial position, a numeric position, a magnitude, and/or a time.

The parameter may include a spatial position within a continuous range of content, with positive parameter progression including forward scrolling the content negative parameter progression including backward scrolling content.

The parameter may include a numeric position within a discrete range of content, with the positive parameter progression including forward incrementing the content the negative parameter progression including backward incrementing the content.

The directional axis may be a geometric axis. The geometric directional axis may be substantially horizontal.

The pose may be a free space pose. The pose may be a hand pose.

The pose may be a free space hand pose, the pose including fingers substantially together and substantially clenched and thumb substantially extended and substantially raised, with the direction of the thumb defining the orientation of the pose for the posture thereof; fingers and thumb substantially together and substantially extended, with the direction of the fingers and the thumb defining the orientation of the pose for the posture thereof; thumb, middle, index, and pinkie fingers substantially together and substantially clenched and index finger substantially extended, with the direction of the index finger defining the orientation of the pose for the posture thereof; and/or fingers and thumb substantially together and substantially clenched to form a fist, with the direction of the first defining the orientation of the pose for the posture thereof.

In another embodiment, an apparatus is provided that includes a processor and a sensor in communication with the processor. The processor is adapted to establish a first control function including a positive parameter progression, a second control function including a negative parameter progression opposed to the positive parameter progression, a third control function including a first logical binary state, and a fourth control function including a second logical binary state opposed to the first logical binary state. The processor is adapted to establish a first directional axis and a second directional axis. The processor is also adapted to establish a first input standard associated with the first control function specifying a pose disposed in a first posture oriented substantially in a first direction along the first axis, a second input standard associated with the second control function and specifying the pose disposed in a second posture oriented substantially in a second direction along the first axis, a third input standard associated with the third control function and specifying the pose disposed in a third posture substantially in a third direction along the second axis, and a fourth input standard associated with the fourth control function and specifying the pose disposed in a fourth posture oriented substantially in a fourth direction along the second axis. The sensor is adapted to sense a posture input. The processor is further adapted to execute the first control function so as to positively progress the parameter if the posture input satisfies the first input standard, to execute the second control function so as to negatively progress the parameter if the posture input satisfies the second input standard, to execute the third control function so as to indicate the first logical binary state if the posture input satisfies the third input standard, and to execute the fourth control function so as to indicate the second logical binary state if the posture input satisfies the fourth input standard.

In such manner, the apparatus is adapted to enable system control with the posture input.

In another embodiment, an apparatus is provided that includes means for establishing a first control function including a positive parameter progression, a second control function including a negative parameter progression opposed to the positive parameter progression, a third control function including a first logical binary state, and a fourth control function including a second logical binary state opposed to the first logical binary state. The apparatus includes means for establishing a first directional axis and a second directional axis. The apparatus also includes means for establishing a first input standard associated with the first control function and specifying a pose disposed in a first posture oriented substantially in a first direction along the first axis, a second input standard associated with the second control function and specifying the pose disposed in a second posture oriented substantially in a second direction along the first axis, a third input standard associated with the third control function and specifying the pose disposed in a third posture substantially in a third direction along the second axis, and a fourth input standard associated with the fourth control function and specifying the pose disposed in a fourth posture oriented substantially in a fourth direction along the second axis. The apparatus includes means for sensing a posture input. The apparatus further includes means for executing the first control function so as to positively progress the parameter if the posture input satisfies the first input standard, executing the second control function so as to negatively progress the parameter if the posture input satisfies the second input standard, executing the third control function so as to indicate the first logical binary state if the posture input satisfies the third input standard, and executing the fourth control function so as to indicate the second logical binary state if the posture input satisfies the fourth input standard. In such manner, the apparatus enables system control with the posture input.

BRIEF DESCRIPTION OF THE SEVERAL VIEWS OF THE DRAWINGS

Like reference numbers generally indicate corresponding elements in the figures.

FIG. 5A through FIG. 5D show example first, second, third, and fourth inputs as postures of a thumb-extended pose, in end-on view.

DETAILED DESCRIPTION OF THE INVENTION

Reference is made herein to poses and postures. While colloquially the terms may be considered similar (and in some instances may even be used interchangeably), as used herein the terms "pose" and "posture" refer to two related but distinct notions.

Figure 1A:
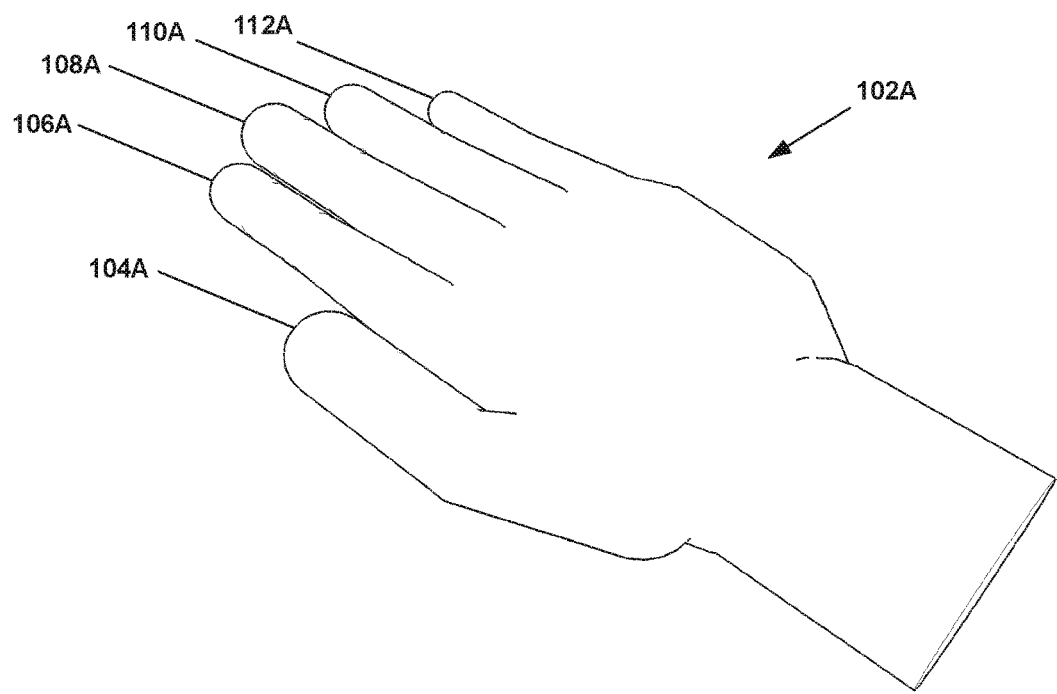
FIG. 1A and FIG. 1B show an example hand pose exhibiting two different example postures.

A pose refers to internal configuration. For example, for a hand, a pose includes which digits are extended, which are curled, whether digits are spread or angled, and so forth. Overall orientation with regard to the external world is not considered in defining a pose. For example, with reference to FIG. 1A, a hand 102A is shown therein with digits 104A, 106A, 108A, 110A, and 112A extended and held together. Also with reference to FIG. 1B, a hand 102B again is shown therein with digits 104B, 106B, 108B, 110B, and 112B extended and held together. In FIG. 1A the hand 102A is oriented with the palm thereof facing downward; in FIG. 1B the hand 102B is oriented with the palm thereof facing to the left. However, even though the orientation of the two hands 102A and 102B is different, the internal configuration is the same. Thus, the hands 102A and 102B have the same pose.

By contrast, posture also considers the orientation of a hand (or other entity) with regard to some frame of reference external to that hand. The hands 102A and 102B in FIG. 1A and FIG. 1B do not show the same posture, because the hand 102A in FIG. 1A is arranged palm down, while the hand 102B in FIG. 1B is arranged palm left.

Figure 1B:
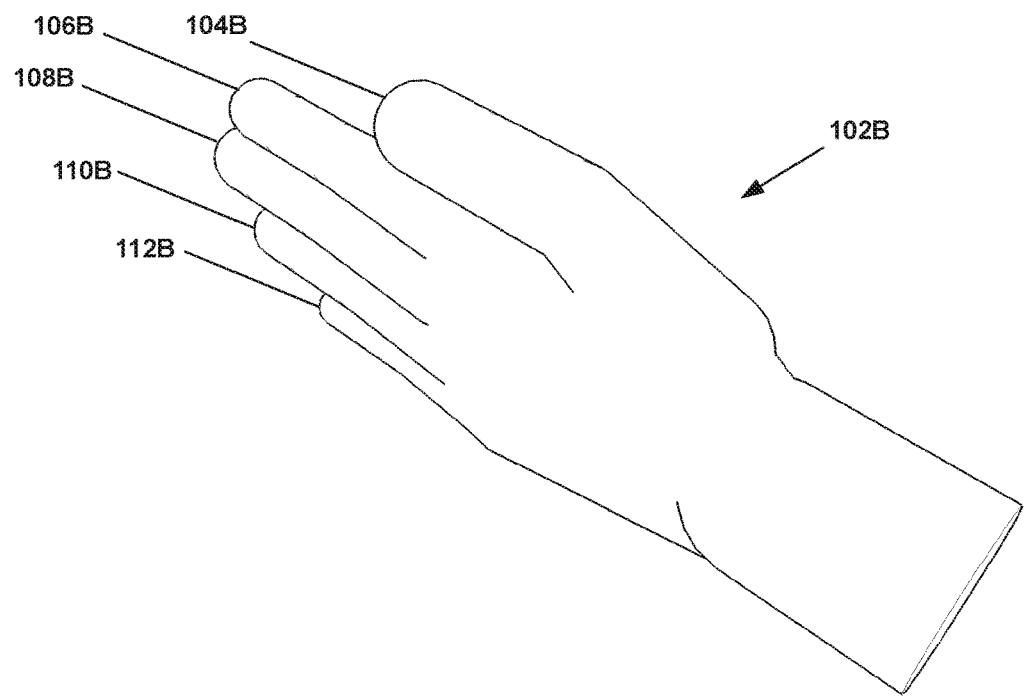

Thus, two particular hands may exhibit the same pose, but different postures, as is the case with the hands in FIG. 1A and FIG. 1B. However, two hands with different poses are not considered to be the same posture. For example, if the hand 102A in FIG. 1A were clenched into a fist without rotating or otherwise moving, that fist then would still be considered a different posture (and also a different pose) than the hand 102A as shown in FIG. 1A.

A distinction between poses and postures may be useful in at least certain instances. For example, when considering interpretation of inputs, e.g. using machine implemented approaches such as by machine vision, it may be convenient to reduce possible inputs to relatively fundamental features. For example, pose and posture may be considered separately, with all first postures potentially being the same pose (assuming no consideration is given as to how the first is made, e.g. whether the thumb is on the outside or the inside). Rather than attempting to identify many "different" inputs based on whether a first is upright or inverted, pointing left, straight ahead, right, up, down, etc., all such inputs may be considered as a single pose ("fist") and the variations distinguished based on orientation/direction. Thus, the distinction between pose and posture may support computational simplicity.

The pose/posture distinction also may support simplicity for users. For example, a user who intends to deliver input with a first may not have to consider how to make a first pointing to the right as being a distinct process from making a first pointing to the left. For the user, both may represent "making a fist", with the direction being a separate but simple factor.

Such an arrangement illuminates a notable advantage of certain embodiments disclosed herein. Namely, for a system of navigation that uses a single pose (or even a related group of poses) in several postures to deliver several different inputs, the user may utilize such an arrangement intuitively. If basic navigation is carried out with several postures, those postures exhibiting a single pose but in different orientations, such an arrangement may prove simple and/or intuitive to users. As a more concrete example, if all (or even several) core navigation functions within a user interface all use (for instance) some variation on the "thumbs up" pose, the user may find such an arrangement relatively intuitive and easy to remember and use.

Moreover, if the system interpreting the inputs may be designed with the expectation that poses for certain basic inputs will be restricted to a single pose, then even if several different postures of that pose may be delivered the use of a single pose may simplify the task of determining what inputs have been delivered. To continue the example above, if a system is designed so that all (or even several) core navigation functions within a user interface use the single "thumbs up" pose in a variety of postures, then distinguishing inputs may not require determining what pose is being implemented; rather, it may assumed to be true (or at least likely) that a given input is the "thumbs up" pose, with only the matter of the orientation of that pose (the posture) left to be determined.

However, such advantages are examples only, and should not be considered as limiting. Other advantages and/or other arrangements may be present in addition to or instead of those noted above as examples.

Likewise, for purposes of certain descriptions herein, the use of the "thumbs up" is presented as an example pose, in various postures (e.g. thumb up, thumb down, etc.). However, this also is an example only, and should not be considered limiting.

As noted, a given pose may be executed in two or more different postures. Because of this, if the posture of an input can be determined as well as the pose, it is possible to associate different responses with each of several postures of a single pose. For example, considering free space hand postures as input for an electronic device such as a head mounted display, a thumbs-up pose oriented in a thumb up posture, a thumb down posture, a thumb left posture, and a thumb right posture (as may be achieved by rotating the hand at the wrist) may invoke four different commands within that head mounted display.

Such "repurposing" of a given pose may be useful in at least certain instances. For example, if a single pose may be used to input any of a group of commands that are in some fashion similar, administering input in such fashion may be relatively intuitive for the user. As a more concrete example, if basic navigation within an interface uses a single pose in different postures to input several different navigational commands, the user may find delivering such inputs intuitive (as opposed for example to using different poses).

However, it is emphasized that grouping pose/posture inputs in such fashion does not necessarily require that all such inputs be identical or even similar in behavior. For example, certain postures of a given pose may invoke a binary input such as "yes/no", while other postures of that pose may invoke incremental inputs such as "move forward/move backward".

Indeed, such an arrangement, while an example, may prove useful in basic navigation within an interface. Broadly speaking, when navigating through many (though not necessarily all) forms of content, "yes", "no", "go forward", and "go back" may serve as "core" functions for navigation. While not all inputs are necessarily only to yes, no, forward, and back, those four inputs may provide a basic structure around which other inputs may be assembled. For example, if the capability for a numeric or alphanumeric input is desired, a "keypad" input may be added; likewise, if the capability for a "take picture" input is desired, such an input also may be added. However, the four core navigational commands—yes, no, forward, and back—nevertheless may remain both intuitive and/or memorable to the user, and consistent throughout various portions of the interface.

Figure 2A:
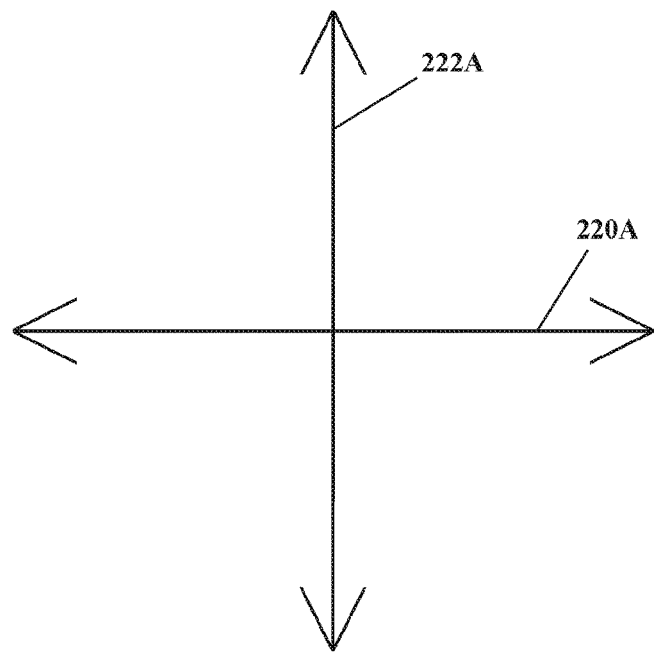
FIG. 2A and FIG. 2B show example input axes and example postures arranged with respect thereto.
Figure 2B:
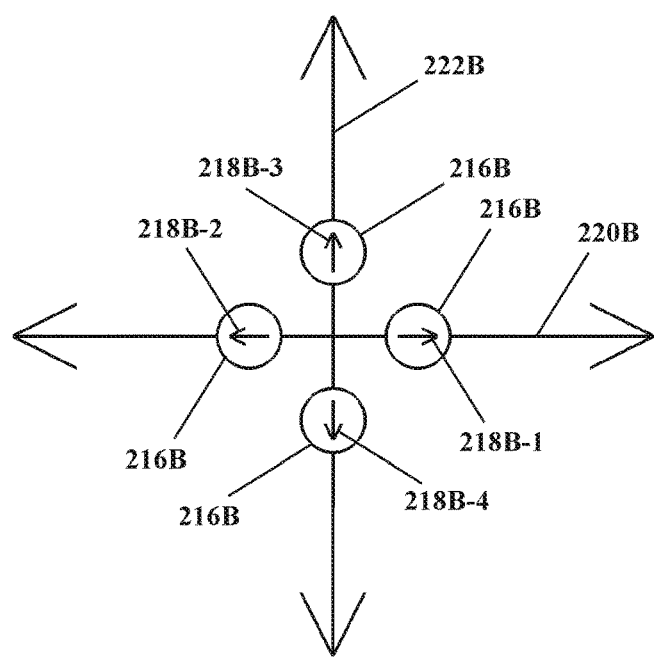

With reference now to FIG. 2A and FIG. 2B, one example arrangement for implementing such core navigational functions with a single pose is shown.

In FIG. 2A, a first input axis 220A is shown, being substantially horizontal (i.e., extending left and right on the page). A second input axis 222A also is shown, being substantially vertical (i.e., extending up and down on the page). Such axes may serve to help define postures using a single pose, for example by providing a frame of reference for the orientation of such a pose so as to manifest several different postures.

In FIG. 2B, similar first and second input axes 220B and 222B are again shown. Four instances of a single pose 216B also are shown. In addition, each pose 216B exhibits a directionality, oriented in one of the two directions of the first and second input axes 220B and 222B. Thus, each of the four poses 216B shown in FIG. 2B also represents a single posture 218B-1, 218B-2, 218B-3, and 218B-4. (For purposes of illustration, circles represent the pose 216B, while the arrows in those instances of the pose 216B identify directionality for the pose 216B, thus distinguishing the four instances of the pose 216B into four separate postures 218B-1, 218B-2, 218B-3, and 218B-4. Colloquially, posture 218B-1 may be considered to be the pose 216B while "pointing right", with posture 218B-2 being the pose 216B while "pointing left", posture 218B-3 being the pose 216B while "pointing up", and posture 218B-4 being the pose 216B while "pointing down". Precise definitions of what "pointing up" etc. entails may vary from one pose to another; for example a first pose may be "pointing up" if the first is extended with the arm substantially vertical and the first at the top, but other poses and postures may be defined differently.)

Thus, as shown in FIG. 2B, a single pose 216B may exhibit four different postures 218B-1, 218B-2, 218B-3, and 218B-4 based on the orientation of that pose 216B along two axes 220B and 222B. Such an arrangement may be useful (as described in more detail below), but is an example only and arrangements may vary considerably. For example, though the axes 220B and 222B are shown in FIG. 2B as being vertical and horizontal, it is not required that two such axes be vertical and horizontal, or even perpendicular to one another. Moreover, arrangements with more than two axes, arrangements with axes that are not coplanar (for example with a third axis pointing in and out of the page), etc. may be equally suitable. Likewise, an arrangement with only one axis, for example 220B, also may be suitable.

However, with two axes 220B and 222B as shown in FIG. 2B, four postures 218B-1, 218B-2, 218B-3, and 218B-4 all with the same pose may be conveniently defined. With four such postures 218B-1, 218B-2, 218B-3, and 218B-4 the four core navigation functions mentioned previously—yes, no, forward, and back—may be associated with one function per posture.

As an example, posture 218B-1—oriented right along the first axis 220B—may be associated with a "forward" command, for example scrolling forward through content (or scrolling the content itself) in some manner or otherwise positively progressing or incrementing some parameter. Posture 218B-2—oriented left along the first axis 220B (the opposite direction from posture 218B-1)—may be associated with a "back" command, for example scrolling backward through content (or scrolling the content itself) in some manner or otherwise negatively progressing or incrementing some parameter. Posture 218B-3—orientated up along the second axis 222B—may be associated with a "yes" or "affirmative" command, for example accepting some feature or otherwise indicating some binary logical state. Posture 218B-4—orientated down along the second axis 222B (the opposite direction from posture 218-3)—may be associated with a "no" or "negative" command, for example rejecting some feature or otherwise indicating some binary logical state (e.g. a logical state opposite that for posture 218B-3). Thus with such an arrangement shown in FIG. 2B, four core navigation functions of forward, back, yes, and no may be implemented with a single pose, and four postures in four directions along two axes.

The arrangement shown in FIG. 2B may be useful in at least certain circumstances, for example potentially being intuitive to certain users. Consider an example arrangement wherein the pose is a first with an extended thumb. The notion of "thumbs up" as meaning "yes" is widespread as a colloquialism (though not necessarily universal); likewise the notion of "thumbs down" as meaning "no" also is widespread. Associating "yes" and "no" commands respectively with "thumbs up" and "thumbs down" postures of an extended thumb pose may be perceived as intuitive by at least certain users. Similarly, in certain cultures such as those using writing systems that are read "left to right", the notion of equating "to the right" with "forward" and/or "to the left" with "backward" also may be perceived as intuitive. Thus, an extended thumb pose oriented to the right (i.e. with the thumb extending right) may be an intuitive posture input for "forward", and an extended thumb pose oriented to the left may be an intuitive posture input for "backward".

It is noted that "thumbs up" is not necessarily a universal affirmative. Certain cultures may associate different meanings, potentially meanings that may not be associated with navigation and/or meanings that are insulting or otherwise less than desirable. Thus, although the extended thumb pose is used herein as a concrete example in certain instances, it is emphasized that embodiments are not limited only to an extended thumb pose. Other poses, including but not limited to fists, flat hands, pointing index fingers, etc. also may be suitable.

However, regardless of the choice of pose, it may be advantageous to organize postures based thereon with regard to opposites, or at least related concepts. For example, with reference to FIG. 2B it may be possible to associate "yes" with upward posture 218B-3, while associating "no" with rightward posture 218B-1. However, where "yes" and "no" typically are understood as opposites, "up" and "right" may not be so understood to be opposites. Thus, arranging opposites—for the four control inputs referenced, pairs "yes" and "no", and "forward" and "backward" respectively—as being spatially opposite (or in some other fashion visibly and/or practically opposite) may be useful in providing intuitive inputs. Thus, while it may be suitable in certain instances to place "yes" and "no" along a horizontal axis such as 220B rather than a vertical axis such as 222B, typically it may not be desirable to arrange postures and inputs in random or arbitrary fashion. In colloquial terms, poses and/or postures should "make sense", and/or "mean something" to prospective users. Typically this may mean opposing "yes" with "no", and/or "forward" with "backward".

It is noted that the use of two different input types—"yes" and "no" in the one instance, and "forward" and "backward" in the other—also may be useful. "Yes" and "no" are essentially binary, that is, a state may be either "yes" or "no", but typically not "maybe", "six", or "blue". By contrast, "forward" and "backward" are progressive through a range, that is, one moves through content as though through pages in a book, through time in a video, through space in a virtual environment, etc. Such a pairing of two different input types may be useful in navigation. For example, while it may be possible to merely use core commands to move (as with "forward" and "backward"), without some way to accept or decline, or deliver at least basic secondary inputs, such input is not much more than passive panning, as opposed to true navigation wherein a user interacts with a system. Conversely, it may be possible to merely use core commands for binary or otherwise discrete inputs (A, B, C, or D), but without some way to select to what the user is saying "yes" or "no" to (from among what the user is selecting A, B, C, or D), such input again is extremely limited.

Thus, as a basic navigational core, at least one indicative option—potentially but not necessarily yes/no or otherwise binary—and at least one dimensional option—potentially but not necessarily forward/back or otherwise progressive—may be useful. Thus, four such inputs may be considered as a core navigational set. (Although this does not exclude the possibility, for example, that for certain instances, simple one-axis panning nonetheless may be sufficient for core input, or that other arrangements also may be suitable.)

It should be understood that the use or identification of certain inputs as "core inputs" does not in any way exclude the use of other inputs. The four core inputs as described may be sufficient to provide basic functionality, and/or also may be intuitive with proper selection and arrangement of pose and postures, but other inputs may be used as well. Examples may include but are not limited to other poses and postures for other functions, and the use of the same pose in other postures (e.g. along a third axis such as in a 2D hexagonal arrangement or a 3D Cartesian arrangement, considering rotation about other axes, etc.).

Figure 3A:
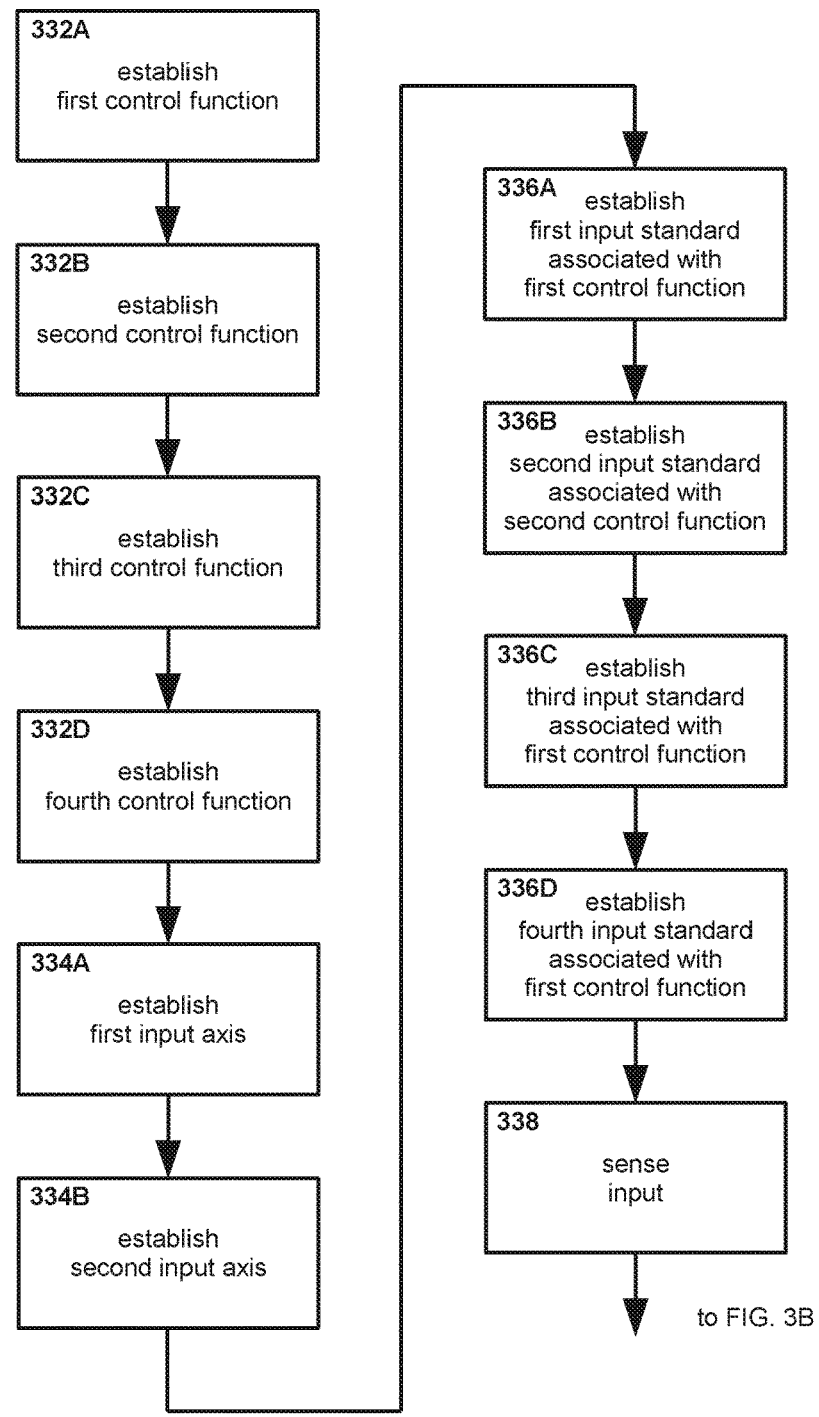
FIG. 3A and FIG. 3B show an example method for controlling a system, in flow chart form.
Figure 3B:
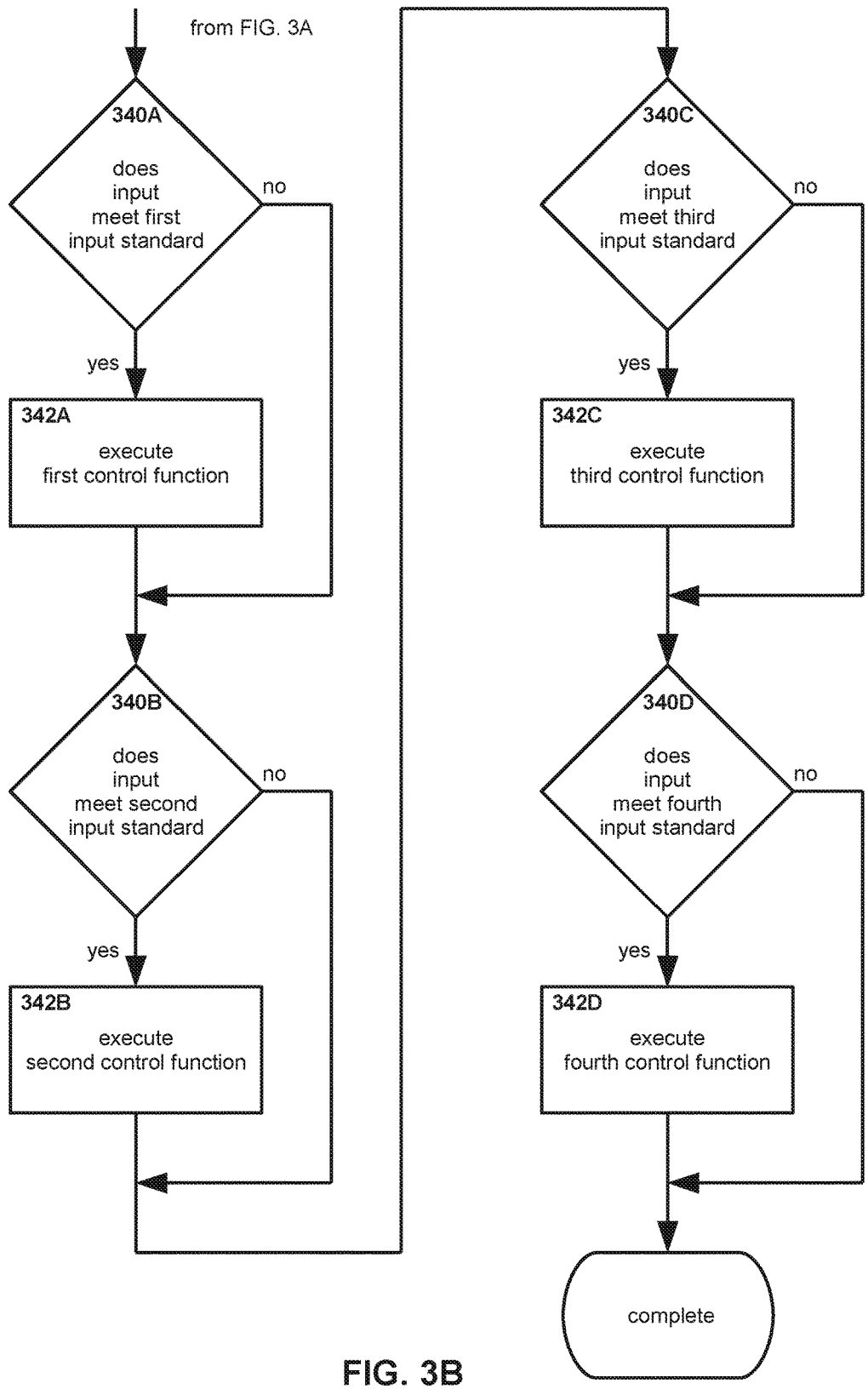

Now with reference to FIG. 3A and FIG. 3B, therein is shown an example arrangement for control using multiple postures of a single pose.

In FIG. 3A, a first control function is established 332A. A control function is some event that causes a response to be carried out, such as an executable instruction instantiated on a processor that when executed carries out some form of command. As a more concrete example, the first control function established 332A may be a navigational command in a processor, that invokes a forward scroll through content (such as advancing through a document, advancing from one slide to the next, etc.) or some other forward progression. However, other arrangements may be suitable.

A second control function is established 332B. For example, the second control function established 332B may be a navigational command in a processor, that invokes a backward scroll through content (such as moving backward through a document, switching from one slide to the previous slide, etc.) or some other backward progression. However, other arrangements may be suitable.

Typically though not necessarily, the first and second control functions may be opposite one another, for example processor commands for "forward" and "backward" respectively. Also typically though not necessarily, the first and second control functions may be, or may be considered as, progressive. That is, the first and second control functions may move through some parameter, such as advancing or retreating through a series of pages or slides. The parameter and motion therethrough may vary considerably. For example, the parameter may be continuous, such as space or distance, with motion therethrough resembling continuous scrolling; however, the parameter also may be discrete, such as a page number or a slide number, so that motion therethrough is incremental (e.g. one page at a time). Other arrangements also may be suitable.

In addition, it is noted that although the parameter associated with the first and second control functions may be linear, it is not required that such a parameter be linear. For example, based on other inputs (such as "yes/no" inputs, described in more detail below), progression through content may branch or otherwise differ. Thus, if a "yes" input is registered for some binary logical consideration, executing a command to go forward with respect to a parameter may result in a different destination than if a "no" input had been registered followed by executing the command to go forward. Thus, the parameter(s) associated with the first and second control functions established 332A and 332B in FIG. 3A may be linear, but also may branch, include loops, etc.

Continuing in FIG. 3A, a third control function is established 332C. For example, the third control function established 332C may be a first of two logical binary states, such as a "yes" or affirmative command that accepts some option. A fourth control function also is established 332D, for example a second of two logical binary states, such as a "no" or negative command that rejects some option. However, other arrangements may be suitable.

Again typically though not necessarily, the third and fourth control functions may be opposite one another, such as in the example given above wherein the third and fourth control functions represent "yes" and "no" respectively. Also typically though not necessarily, the third and fourth control functions may be, or may be considered as, selective rather than progressive. That is, the third and fourth control functions may represent selections, such as of logical states (yes/no, success/failure, understood/not understood, etc.). The particulars may vary considerably, however, and the examples given should not be considered as limiting.

Still with reference to FIG. 3A, a first input axis is established 334A. The first input axis represents some arrangement so as to define the possibility of at least two distinct inputs based at least in part on directionality with respect to that axis. For example, a horizontal spatial axis presents the possibility of options to the right or to the left (though other arrangements also may be suitable). A second input axis also is established 334B. The second input axis also represents some arrangement so as to define the possibility of at least two distinct inputs based at least in part on directionality with respect to that axis. For example, a vertical spatial axis presents the possibility of options up or down (though again other arrangements may be equally suitable).

Typically though not necessarily, the first and second axes may be spatial and/or directional in nature. Likewise typically though not necessarily, the first and second axes may be perpendicular to one another, for example being horizontal and vertical axes. However, it is noted that axes need not be defined precisely or absolutely. For example, if first and second axes are to be established 334A and 334B so as to be vertical and horizontal, it is not required for the axes to be perfectly vertical and/or perfectly horizontal, or perfectly perpendicular, or defined with regard to any particular frame of reference. So long as the axes are sufficient distinct as to be functionally different (e.g. in terms of aligning postures therewith), definition may be sufficient.

It is noted that axes are not required to be strictly linear. For example, an axis may be curved, for example so as to conform to human ranges of motion, etc. (e.g. curves defined by motions of various body joints). Stated differently, axes are not required to be strictly Cartesian, and may be defined within spherical spaces, or even be arbitrarily curved or shaped to at least some degree, so long as those axes provide clear distinction between orientations in one direction along such an axis and the opposite direction along that axis.

In addition, it is noted that defining "axes" is at least in part an illustrative notion, and is not necessarily limited to explicit axes. That is, defining quadrants of space, one extending to the right and one to the left, so as to define orientations to the left or the right, may be functionally equivalent to defining an axis. Definition of axes should be understood to encompass such variations. It is not necessarily required that a literal spatial axis be defined, so long as substantially opposing directionality is defined in some manner. While establishing 334A and 334B explicit axes is not prohibited, neither is establishing 334A and 334B explicit axes required.

Continuing in FIG. 3A, a first input standard is established 336A, associated with the first control function. That is, an event or events sufficient to be considered "input" for invoking the first control function are specified, i.e. defined as some standard.

The particulars of the first input standard (and likewise other input standards referenced below) may vary considerably. For example, the type of input may at least in part determine the form of the first input standard. As a more concrete example, if a hand posture is to serve as input, then the pose of the hand and the orientation of the hand may be part of the first input standard. Furthermore, even for such a posture the first input standard may vary. For example, the posture may be defined geometrically and/or mathematically, such as in terms of the two-dimensional shape or outline of a hand, or in terms of the three-dimensional shape of the hand, or in terms of particular mathematical or dimensional relations (e.g. ratios of values such as finger length).

Input standards may be based on sensed data, derived data, stored data, etc., and are not limited with regard to data source. For example, the first input standard for a pose and/or posture of a hand may consider the two-dimensional outline of the hand (e.g. directly sensed data such as by an imager), a three-dimensional wire skeleton of the hand (e.g. not necessarily directly sensed but at least potentially determined from sensed data, for example by computational techniques), a base model of anticipated hand parameters (e.g. predetermined based on typical human anatomy and stored for use), etc.

In addition, the type of data anticipated to be available regarding the input may affect the particulars of the first input standard. If data is obtained from an RGB camera image, for example, then features such as two dimensional shape and/or color may be considered, but three-dimensional shape may not be (as three-dimensional shape typically is not provided by a single RGB image). If data is obtained from a depth camera image, then three dimensional shape may be considered (e.g. based on depth data for the pixels in the image) but color data may not be considered (e.g. if the depth camera lacks color discrimination). If data is obtained from multiple sources, such as a pair of RGB imagers in a stereo configuration, an RGB imager in combination with a depth imager, etc., then data of several different sorts may be considered. These are examples only, and other arrangements also may be suitable.

Typically though not necessarily, the first input standard may take the form of data and/or executable instructions instantiated on a processor. However, as noted the form may vary considerably, and thus the term "standard" should be understood broadly. The first input standard is not required to have any particular form, but rather is defined functionally: that is, the first input standard is sufficient to determine whether a particular posture associated with a particular command has been executed.

Also typically though not necessarily, the first, second, third, and fourth input standards may be established 336A, 336B, 336C, and 336D so as to be exclusive of one another. That is, an input that satisfies the first input standard could not also satisfy any of the second, third, or fourth input standards. In other words, each input standard may be unique, such that a given input cannot readily be considered to satisfy two or more input standards. For example, considering a first input standard defining a "fist to the right" posture and a second input standard defining a "fist to the left" posture, the first and second input standards may be established 336A and 336B so that no anticipated posture reasonably would satisfy both the first and second input standards. More colloquially, the standards limit an input to one or the other, but not both at once.

Still with reference to FIG. 3A, a second input standard is established 336B, associated with the second control function. An event or events sufficient to be considered "input" for invoking the second control function are specified. A third input standard is established 336C associated with the third control function, and a fourth input standard is established 336D associated with the fourth control function. Again, an event or events sufficient to be considered "input" for invoking the third and fourth control functions respectively are specified.

Typically though not necessarily, the first, second, third, and fourth input standards all may refer to various postures of a single pose. In such instance, the first, second, third, and fourth input standards may refer to postures at least substantially orientated with regard to first and second axes. For example, considering as a pose a "thumb extended" configuration of a hand, the first input standard may specify that pose in a rightward orientation (with the thumb pointing to the right, e.g. along a horizontal first axis), the second input standard may specify that pose in a leftward orientation, the third input standard may specify that pose in an upward orientation, and the fourth input standard may specify that pose in a downward orientation. However, these are examples only, and other arrangements may be equally suitable.

With regard to the term "establish" (e.g. with respect to control functions, input axes, input standards, etc.), it is noted that to establish something may, depending on particulars, refer to either or both the creation of something new (e.g. establishing a business, wherein a new business is created) and the determination of a condition that already exists (e.g. establishing the whereabouts of a person, wherein the location of a person who is already present at that location is discovered, received from another source, etc.).

Similarly, "establishing" various entities as shown in FIG. 3A may encompass a range of events. For example, control functions, input axes, input standards, etc. may be created computationally (e.g. in a processor), may be read from stored data (e.g. instantiated onto a processor from a hard drive or solid state drive), may be received as communication from some external system, defined based on inputs, some combination thereof, etc. Unless otherwise specified, the manner by which various features may be established is not limited unless, nor is the actor (if any) that establishes those features limited.

Still with reference to FIG. 3A, an input is then sensed 338. The input may vary considerably. Typically though not necessarily, the input is a pose, such as a hand pose, exhibiting one of several postures. The input is not required to be one that meets any of the first, second, third, or fourth input standards established 336A, 336B, 336C, and 336D previously; other inputs may be sensed. The method as shown in FIG. 3A and FIG. 3B does not necessarily provide for action in response to such other inputs, but the existence of additional inputs, or even the sensing and execution of control functions or other actions in response thereto, also is not prohibited.

The manner by which the input is sensed is not limited. Typically though not necessarily, one or more sensors will provide data regarding an input. For example, a depth camera may capture an image or series of images, with the data in those images being analyzed to determine whether a hand is present, what pose the hand exhibits, what posture, etc. However, other arrangements also may be equally suitable.

Moving on to FIG. 3B, a determination is made 340A as to whether the input meets the first input standard. That is, does the input as sensed in 338 meet whatever criteria were set in establishing the first input standard 336A? As a more concrete example, if the first input standard refers to a "thumb extended" pose oriented with the thumb to the right along a horizontal first axis, does the input in fact reflect a hand in a thumb extended pose with the thumb oriented to the right?

If the determination 340A is positive—if the input does satisfy the first input standard—then the method continues with step 342A. If the determination 340A is negative—if the input does not satisfy the first input standard—then the method skips step 342A and continues with step 340B.

If the determination 340A is positive, then the first control function is executed 342A in response to the input. For example, if the first control function is to advance incrementally through some discrete form of content, then that content is then advanced one increment. More colloquially, a system subject to the first control function may move to the next slide, the next page, the next question, etc.

Moving on in FIG. 3B, a determination is made 340B as to whether the input meets the second input standard. If the determination 340B is positive—if the input does satisfy the second input standard—then the method continues with step 342B, wherein the second control function is executed. However, if the determination 340B is negative—if the input does not satisfy the second input standard—the method skips step 342B and continues with step 340C.

Similarly, a determination is made 340C as to whether the input meets the third input standard. If the determination 340C is positive—if the input does satisfy the third input standard—then the method continues with step 342C, wherein the third control function is executed. However, if the determination 340C is negative—if the input does not satisfy the third input standard—the method skips step 342C and continues with step 340D.

Again, a determination is made 340D as to whether the input meets the fourth input standard. If the determination 340D is positive—if the input does satisfy the fourth input standard—then the method continues with step 342D, wherein the fourth control function is executed. However, if the determination 340D is negative—if the input does not satisfy the fourth input standard—the method skips step 342D.

It is noted that the particular arrangement of determinations 340A, 340B, 340C, and 340D as shown in FIG. 3B is an example only, and other arrangements may be equally suitable. For example, a where FIG. 3B shows four binary determinations 340A, 340B, 340C, and 340D, it may be equally suitable to use a single determination, e.g. "does the input meet any of the first, second, third, or fourth input standards?" and then executing the appropriate first, second, third, or fourth control function. Other arrangements also may be equally suitable.

It is noted that the method as shown in FIG. 3A and FIG. 3B may complete without any of the first, second, third, and fourth control functions being executed, for example if input does not meet any of the first, second, third, and fourth input standards (or more trivially, if no input is received at all). Such an event is acceptable; input may be delivered to invoke other control functions than those shown in FIG. 3A and FIG. 3B, input may be incorrect or unrecognizable, or events addressed as a system as potential input in fact may not be and/or may not be intended to be input at all (e.g. being conversational hand motions, image artifacts, etc.).

However, in certain instances it may be useful to simply assume that any input would be intended by a user to meet one of the first, second, third, or fourth input standards, and exclude the possibility of input not meeting any of the first, second, third, and fourth input standards. In such instance, selection may be made based on which of the first, second, third, and fourth input standards the input most closely resembles, even if none are fully satisfied.

In addition, as noted previously, in at least certain embodiments the first, second, third, and fourth input standards may be established 338A, 338B, 338C, and 338D so as to be unique, that is, so that input is not anticipated to satisfy more than one such. Thus, although logically it may be possible that more than one determination 340A, 340B, 340C, and 340D could be positive (and thus more than one control function could be executed 342A, 342B, 342C, and 342D), in practice for the arrangements shown and described herein any one input typically will satisfy (at most) one determination 340A, 340B, 340C, and 340D, so that only one such control function 342A, 342B, 342C, and 342D is executed in response thereto. However, other arrangements also may be suitable.

In particular, it is noted that control functions may be plural entities. That is, though (for example) the first control function is referred to herein in the singular, the first control function at least potentially could encompass two or more individual executable instructions, commands, etc., and the second, third, and/or fourth control functions likewise.

Although FIG. 3B shows the method therein as being complete after step 342D for purposes of simplicity, in practice a method may repeat, for example returning to step 338 in a loop so as to sense input in an ongoing fashion. A method also may proceed on to additional steps, may otherwise be more complex, etc.

Now with reference to FIG. 4A through FIG. 4D, therein are shown four example postures as may serve as inputs for controlling a system, and as may satisfy first, second, third, and fourth input standards respectively and/or invoke first, second, third, and fourth control functions respectively for an arrangement similar to that shown in FIG. 3A and FIG. 3B. Although FIG. 4A through FIG. 4D and certain other figures herein depict a thumb-extended pose in various postures, it is emphasized that both the particular pose and the particular postures thereof as illustrated are examples only, and that embodiments are not limited only thereto.

Figure 4A:
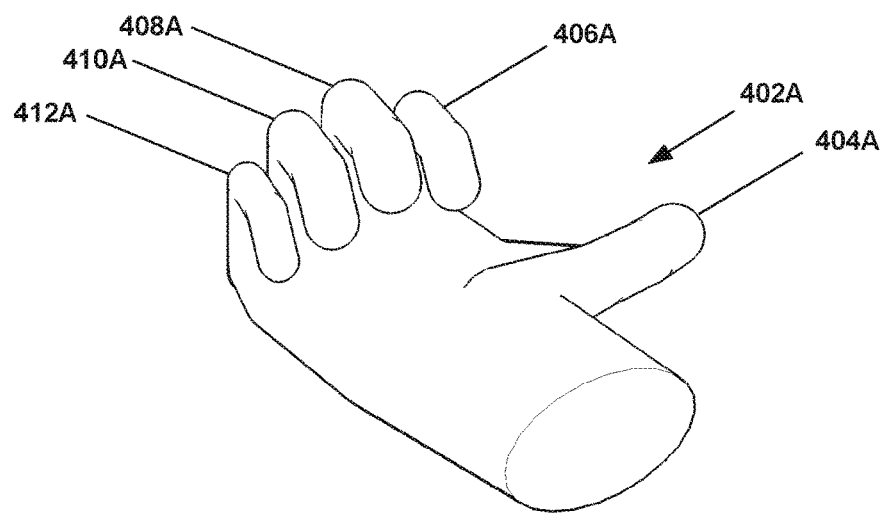
FIG. 4A through FIG. 4D show example first, second, third, and fourth inputs as postures of a thumb-extended pose, in perspective view.

In FIG. 4A, a hand 402A is shown. As may be seen, the thumb 404A is substantially extended, and the other four digits 406A, 408A, 410A, and 412A are substantially curled towards the palm and held substantially together. The configuration of the hand 402A with respect to itself—thumb 404A extended, other digits 406A, 408A, 410A, and 412A curled—is considered for purposes of discussion herein to be a pose, as described previously. That is, a pose does not consider orientation of the hand (or other object under consideration) with regard to an external frame of reference, merely the configuration of the hand itself.

However, as also may be seen in FIG. 4A, the hand 402A is oriented in space such that the extended thumb 404A points substantially toward the right. Such orientation of the pose of the hand 402A is considered for purposes of discussion herein to be a posture, as also described previously. "Thumb extended" is the pose shown in FIG. 4A; "thumb right" is the posture of that pose as shown in FIG. 4A.

For purposes of example, the hand pose in the posture shown in FIG. 4A is presented as a first of four inputs (the rest shown in FIG. 4B, FIG. 4C, and FIG. 4D) for navigating within a system. That first input as shown in FIG. 4A may be constrained to a first input standard that specifies the pose and posture to at least approximately that shown. That input standard itself may reference a horizontal first axis (not shown in FIG. 4A), such that the thumb 404A aligns substantially along that first axis in one direction (i.e. to the right). In addition, a first control function may be associated with the pose and posture as shown in FIG. 4A, such that sensing the pose and posture as shown in FIG. 4A invokes the first control function. Again as an example, that first control function may be a forward progression, such as moving from one slide to the next.

Figure 4B:
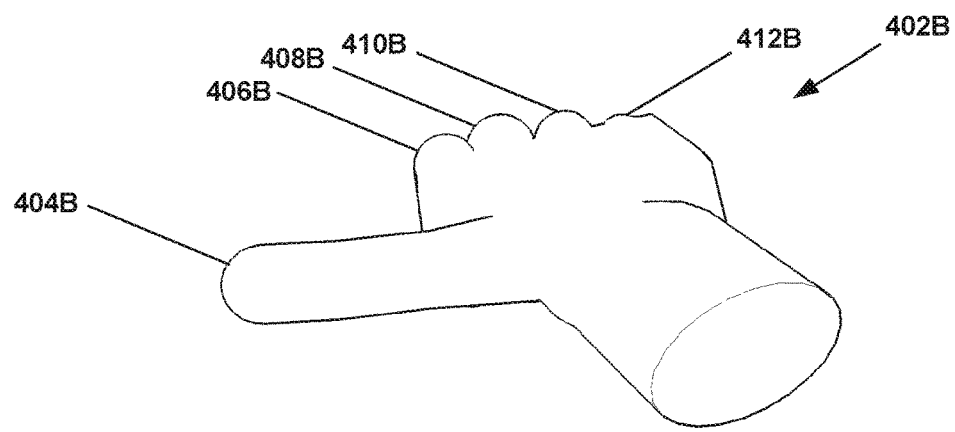

Turning to FIG. 4B, again a hand 402B is shown. The thumb 404B is substantially extended, and the other four digits 406B, 408B, 410B, and 412B are substantially curled towards the palm and held substantially together. Thus the pose of the hand 402B shown in FIG. 4B is at least substantially the same as the pose of the hand 402A shown in FIG. 4A. However, as also may be seen in FIG. 4B, the hand 402B is oriented with the extended thumb 404B pointing substantially toward the left. Thus, although the poses of hands 402A and 402B may be similar or identical, the postures exhibited by hands 402A and 402B are different (and in at least a directional sense, opposites).

For purposes of example, the posture in FIG. 4B is presented as a second input for navigating within a system. That second input may be constrained to a second input standard that specifies the pose and posture, and that second input standard may reference a horizontal first axis such that the thumb 404B aligns substantially along that first axis in a second direction (i.e. to the left) substantially opposite that of the thumb 404A in FIG. 4A. A second control function may be associated with the posture in FIG. 4B, such that sensing the posture in FIG. 4B invokes the second control function. The second control function may be a backward progression, such as moving from one slide to the previous.

Figure 4C:
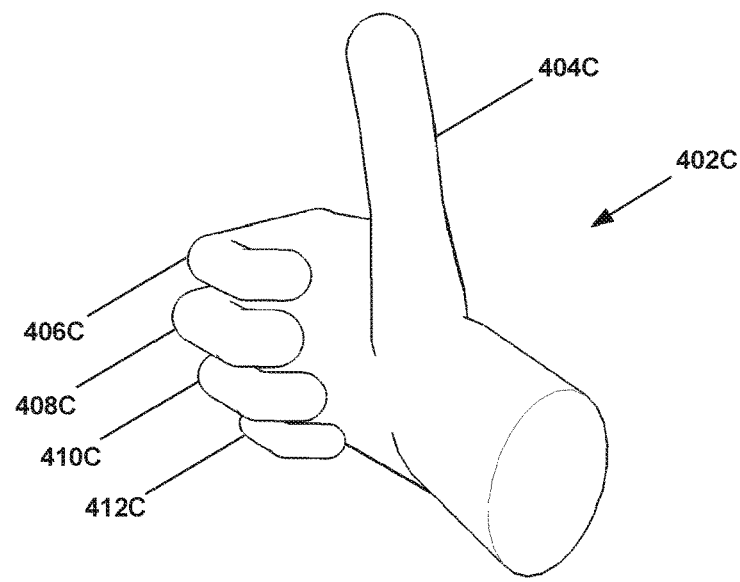

Now with reference to FIG. 4C, a hand 402C is shown. The thumb 404C is substantially extended, and the other four digits 406C, 408C, 410C, and 412C are substantially curled towards the palm and held substantially together. Thus the pose of the hand 402C shown in FIG. 4C is at least substantially the same as the pose of the hands 402A and 402B shown in FIG. 4A and FIG. 4B. However, in FIG. 4C the hand 402C is oriented with the extended thumb 404C pointing substantially upward. Although the poses of hand 402C may be similar or identical to the poses of hands 402A and 402B, the posture exhibited by hand 402C is different from those exhibited by 402A and 402B.

For purposes of example, the posture in FIG. 4C is presented as a third input for navigating within a system. That third input may be constrained to a third input standard that specifies the pose and posture, and that third input standard may reference a vertical axis (not shown in FIG. 4C) such that the thumb 404C aligns substantially along that second axis in a first direction (i.e. up). A third control function may be associated with the posture in FIG. 4C, such that sensing the posture in FIG. 4C invokes the third control function. The third control function may be a first binary state, such as "yes".

Figure 4D:
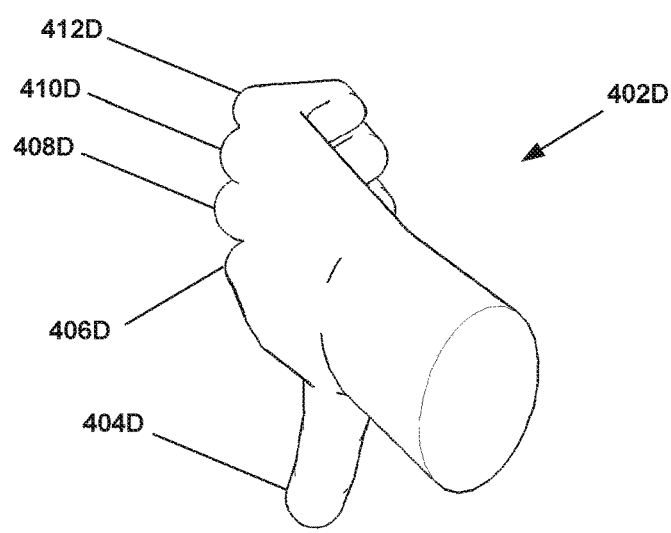

Turning to FIG. 4D, a hand 402D is shown. The thumb 404D is substantially extended, and the other four digits 406D, 408D, 410D, and 412D are substantially curled towards the palm and held substantially together. Thus the pose of the hand 402D shown in FIG. 4D is at least substantially the same as the pose of the hands 402A, 402B, and 402C shown in FIG. 4A, FIG. 4B, and FIG. 4C respectively. However, in FIG. 4D the hand 402D is oriented with the extended thumb 404D pointing substantially downward. Although the poses of the hand 402D may be similar or identical to the poses of hands 402A, 402B, and 402C, the posture exhibited by hand 402D is different from those exhibited by 402A, 402B, and 402C (and in at least a direction sense, opposite to the posture of hand 402C).

For purposes of example, the posture in FIG. 4D is presented as a fourth input for navigating within a system. That fourth input may be constrained to a fourth input standard that specifies the pose and posture, and that fourth input standard may reference a vertical axis such that the thumb 404D aligns substantially along that second axis in a second direction (i.e. down) substantially opposite that of the thumb 40CA in FIG. 4C. A fourth control function may be associated with the posture in FIG. 4D, such that sensing the posture in FIG. 4D invokes the fourth control function. The fourth control function may be a second binary state opposed to the first binary state associated with the posture of FIG. 4C, such as "no".

As may be seen, collectively the poses exhibited by the four hands 402A, 402B, 402C, and 402D are all identical or at least substantially similar, even though the postures of those four hands 402A, 402B, 402C, and 402D are visibly different, being oriented right, left, up, and down respectively. Colloquially, it might be said that a user making such postures is "doing the same thing, in different directions". In effect, the user would be required to remember only a single pose, using that pose for postures oriented in several directions; such an arrangement may be simple and/or intuitive, particularly if (as in the example shown) the postures themselves are evocative of the control functions to be delivered: thumb right and thumb left for forward and back, and thumb up and thumb down for yes and no.

As noted previously, those four functions—forward, back, yes, and no—may serve as at least the functional core of navigation for controlling a system. Thus four postures, using a single pose, oriented along two axes, may provide sufficient basic functionality as to control a device (e.g. a portable electronic device, a wearable device such as a head mounted display, a home game console, etc.). As may be understood, the particulars of such an arrangement are not necessarily arbitrary.

Use of a single for such core navigational functions pose may simplify recognition protocols (e.g. making machine vision or other sensing tasks more manageable), and/or may be easy to remember for a user. Such an arrangement—one single pose, used for several clearly designated functions—might be described as "unity of control".

Use of linear axes may facilitate opposition of functions. That is, for "yes/no" binary inputs, using opposite directions for opposite meanings—up and down, for yes and no respectively—may be intuitive to users. Such opposition also may enable more convenient discrimination of one input from another. Although machine vision and other sensing techniques may be subject to a variety of challenges, discriminating "up" from "down" may be a relatively straightforward matter (as opposed for example to detecting and identifying more subtle differences).

Use of multiple axes enables a greater number of inputs (e.g. four with two oppositional axes, vs. two with a single axis). Use of clearly distinct axes may again facilitate easy memorization of inputs for users, since "up, down, right, and left" are conceptually simple. Clearly distinct axes also may ease challenges in detecting and discriminating different inputs, as noted above with regard to linear axes.

Furthermore, associating two different functions with two different axes may be useful in at least certain embodiments. A combination of a selection input and a motion input together may support at least basic navigation. In the example shown and described with regard to FIG. 4A through FIG. 4D, that selection input is yes/no, while the motion input is forward/back. Selection alone or motion alone provides only very limited navigation, as noted previously. However, given at least one selection option with at least two choices and at least one motion option with at least two choices, a much richer, more capable interface may be provided. One way of achieving such clarity is to use axes that are perpendicular to one another, though other arrangements also may be suitable.

It is of course possible to support additional choices for selection (e.g. A through D rather than yes/no) and/or for motion (forward/back/up/down), and/or to provide additional selection functions, motion functions, and or other functions. In practice such additional functionality may be useful, and is not excluded from use with the core navigation arrangements shown and described herein. However, two observations may be illuminating in this matter.

First, as a general principle of design, it is in some ways ideal to make a system "as simple as possible (but no simpler)". Thus, defining as core navigation functionality a minimum set of inputs and control functions that enables effective navigation—in the example of FIG. 4A through FIG. 4D, yes/no and forward/back—may be useful both for users of an interface and designers who anticipate that interface being used.

Second, while it may be useful to have a large number of possible commands in a system, and/or for those commands to exhibit considerable variety, it is generally preferable that the necessary core functions—which in an interface may include basic navigation—be few in number. In part, this is for user convenience; a user may readily remember a handful of commands (particularly if those commands are similar and/or intuitive, e.g. through thumb pointing as in FIG. 4A through FIG. 4D), but remembering many dozens of commands may be problematic. It may be acceptable for a user to recall only some subset of a large number of optional commands, such as those he or she uses regularly, but it may not be prudent to expect users to remember a large number of commands that are necessary for system control. In addition, if core commands proliferate excessively, then those commands themselves may become indefinite. That is, if there are multiple commands to address a single function such as "indicate yes or no", then the definition and behavior of different varieties of indicating yes or no may be different (even if in subtle ways).

Thus, the particulars of the example shown and described with regard to FIG. 4A through FIG. 4D—unity of control with a single posture for core navigation inputs, a small number of core inputs with a variety of functions (e.g. selection and motion), clear oppositional and axial definitions for inputs, and choice of intuitive inputs—may be advantageous as noted above (and for other reasons not necessarily specified herein).

However, the arrangement in FIG. 4A through FIG. 4D is an example only, and other arrangements may be equally suitable.

Now with reference to FIG. 5A through FIG. 5D, therein four postures of a thumb-extended pose are again shown. The pose and postures are at least somewhat similar to FIG. 4A through FIG. 4D, but are shown end-on in FIG. 5A through FIG. 5D for clarity (and as a baseline for description of degeneracy with regard to FIG. 6A through FIG. 6D, below).

In FIG. 5A, as may be seen a hand 502A is shown therein with a pose such that the thumb 504A is extended and the fingers 506A through 512A are curled towards the palm. Such a pose may be referred to as a thumb-out or thumb-extended pose. (Colloquially, a pose as shown in FIG. 5A is sometimes referred to as "thumb-up", but when oriented with the thumb right as in FIG. 5A such description may be unclear.) The hand 502A is oriented so as to exhibit a thumb-right posture, with the thumb aligned horizontally and extending to the right as seen.

In FIG. 5B, a hand 502B is shown in a pose with thumb 504B extended and fingers 506B through 512B curled towards the palm. The hand 502B is oriented in a thumb-left posture, with the thumb aligned horizontally and extending to the left.

In FIG. 5C, a hand 502C is shown in a pose with thumb 504C extended and fingers 506C through 512C curled towards the palm. The hand 502C is oriented in a thumb-up posture, with the thumb aligned vertically and extending up.

In FIG. 5D, a hand 502D is shown in a pose with thumb 504D extended and fingers 506D through 512D curled towards the palm. The hand 502D is oriented in a thumb-down posture, with the thumb aligned vertically and extending down.

Taken together, the hands 502A, 502B, 502C, and 502D may be taken to represent four inputs similar to those described with regard to FIG. 4A through FIG. 4D. Notably, as may be seen in FIG. 5A through FIG. 5D the alignment of each pose may be seen to be precise, in that the thumbs 504A, 504B, 504C, and 504D are oriented directly right, left, up, and down respectively. In some sense the precision of orientation of the poses in FIG. 5A through FIG. 5D may be considered to represent an ideal: for example, the "thumb-up" in FIG. 5C is directly up, rather than being noticeably offset.

However, with reference to FIG. 6A through FIG. 6D, it is not required that such precision exist, or that postures be defined so as to specify precise orientation.

Figure 6A:
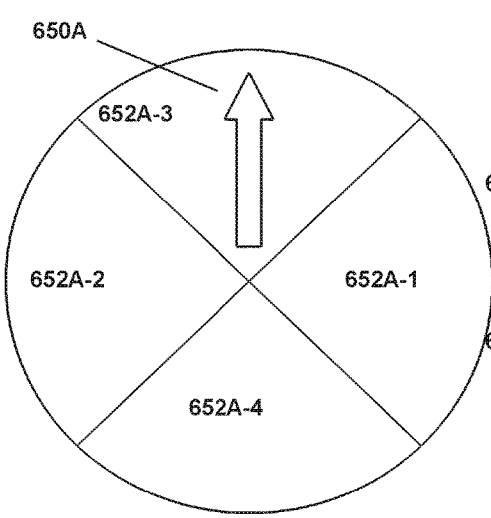
FIG. 6A through FIG. 6D show example ranges of alignment degeneracy for postures, in schematic view.

In FIG. 6A, a directional arrow 650A is shown, pointing upward. For purposes of discussion, the directional arrow 650A represents the two-dimensional orientation of a posture. For example, considering a thumb-extended pose, the upward orientation of the directional arrow 650A may indicate that the hand is oriented with the extended thumb pointing upward (i.e. in the direction of the arrow shown in FIG. 6A).

FIG. 6A also shows four arc sections 652A-1, 652A-2, 652A-3, and 652A-4. Each arc section 652A-1, 652A-2, 652A-3, and 652A-4 is shown to encompass 90 degrees of arc, in directions corresponding with right, left, up, and down respectively. FIG. 6A illustrates one possible arrangement for addressing possible degeneracy in orientation of postures. Namely, rather than requiring perfect alignment to the left, the right, up, or down, so long as a suitable pose falls within 90 degree arcs 652A-1, 652A-2, 652A-3, and 652A-4 that pose will be accepted as a posture oriented left, right, up, or down respectively.

FIG. 6A thus represents tolerance of a high level of degeneracy. A posture may be considered as "degenerate" if the posture deviates in some manner from the ideal for that posture, typically though not necessarily in terms of orientation in space. In practice, some level of degeneracy may be expected in real-world posture inputs. To some degree this may represent "sloppiness" in executing postures, but postures also may be executed differently by different users. For example, some users may perceive "vertically up" slightly differently than other users. Thus postures tend to be at least somewhat unique; an analogy might be that many writers may tend to incline their letters to some degree or other, rather than writing the letters so as to be perfectly vertical. In addition, sensors and processing techniques may introduce apparent error in orientation of sensed postures, even if a user executes those postures perfectly.

Thus, some degree of tolerance for degeneracy in postures may be desirable in at least certain embodiments. The arrangement shown in FIG. 6A, wherein the degree of allowed degeneracy is up to plus-or-minus 45 degrees, may be suitable in certain instances.

Figure 6B:
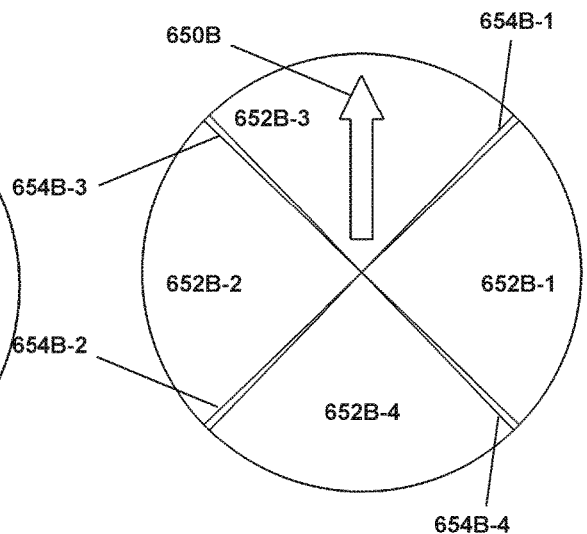

However, in other instances it may be useful to limit the allowable degeneracy to at least some degree. With reference to FIG. 6B, a directional arrow 650B again is shown, as an example orientation of a posture. FIG. 6B also shows arc sections 652B-1, 652B-2, 652B-3, and 652B-4, each encompassing approximately 88 degrees of arc in directions corresponding with right, left, up, and down respectively. FIG. 6B shows four additional arc sections 654B-1, 654B-2, 654B-3, and 654B-4, each encompassing approximately 2 degrees of arc in between adjacent arc sections 652B-1, 652B-2, 652B-3, and 652B-4. The 88 degree arc sections 652B-1, 652B-2, 652B-3, and 652B-4 represent orientations that may be accepted as right, left, up, and down oriented postures; the 2 degree arc sections 654B-1, 654B-2, 654B-3, and 654B-4 represent orientations that may be rejected as not being acceptable posture orientations.

The arrangement in FIG. 6B exhibits relatively large ranges of acceptable orientations (i.e. 88 degrees for each of the four orientations therein), as does the arrangement in FIG. 6A. However in FIG. 6B the 2 degree "dead zones" serve as buffers. Where in FIG. 6A, a posture oriented 45 degrees off of vertical or horizontal might satisfy two adjacent orientations of posture, e.g. right and up, at the same time. Alternately, a sensor or processing technique may "stutter" between identifying a pose at a 45 degree angle as an "up" posture and a "right" posture, shifting back and forth rapidly between two different determinations. Either case for FIG. 6A may present problems, while the arrangement in FIG. 6B may avoid such problems.

Figure 6C:
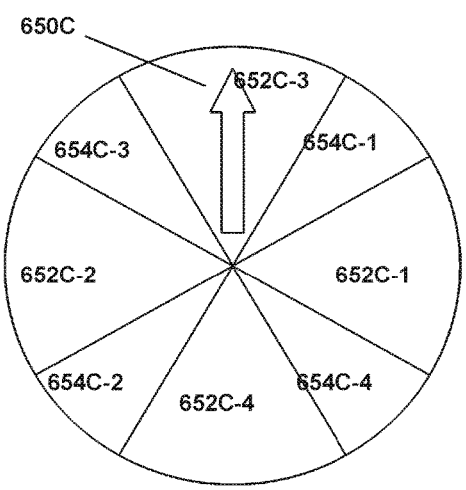

Turning to FIG. 6C, a directional arrow 650C is shown. FIG. 6C shows arc sections 652C-1, 652C-2, 652C-3, and 652C-4, each encompassing approximately 60 degrees of arc in directions corresponding with right, left, up, and down respectively. FIG. 6C also shows arc sections 654C-1, 654C-2, 654C-3, and 654C-4, each encompassing approximately 30 degrees of arc, in between adjacent arc sections 652C-1, 652C-2, 652C-3, and 652C-4. The 60 degree arc sections 652C-1, 652C-2, 652C-3, and 652C-4 represent orientations that may be accepted as right, left, up, and down oriented postures; the 30 degree arc sections 654C-1, 654C-2, 654C-3, and 654C-4 represent orientations that may be rejected as not being acceptable posture orientations.

The arrangement in FIG. 6C exhibits moderately large ranges of acceptable orientations (60 degrees for each of the four orientations therein), but also exhibits moderately large "dead zones" (30 degrees each) as well. Such an arrangement tolerates degeneracy in posture, but also has significant "dead" arcs distinguishing and separating the acceptable orientations. Such an arrangement may be useful if, for example, determining orientation to within a few degrees is either impossible or for some reason undesirable, for example due to limitations in hardware, processing power etc.

Figure 6D:
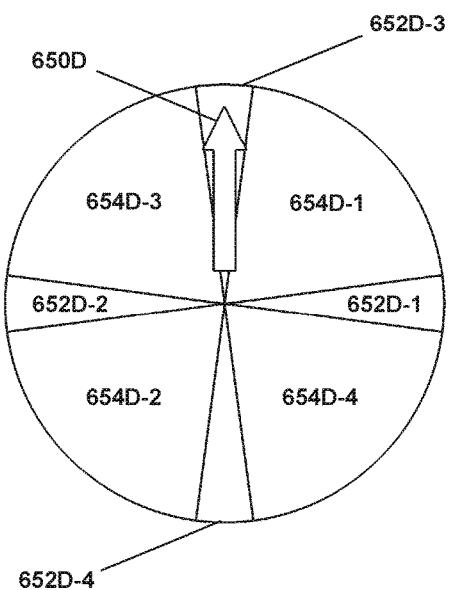

Similarly, FIG. 6D shows a directional arrow 650D, along with arc sections 652D-1, 652D-2, 652D-3, and 652D-4, each encompassing approximately 15 degrees of arc in directions corresponding with right, left, up, and down respectively. FIG. 6D also shows arc sections 654D-1, 654D-2, 654D-3, and 654D-4, each encompassing approximately 75 degrees of arc, in between adjacent arc sections 652D-1, 652D-2, 652D-3, and 652D-4. The 15 degree arc sections 652D-1, 652D-2, 652D-3, and 652D-4 represent orientations that may be accepted as right, left, up, and down oriented postures; the 75 degree arc sections 654D-1, 654D-2, 654D-3, and 654D-4 represent orientations that may be rejected as not being acceptable posture orientations.

The arrangement in FIG. 6D exhibits relatively small ranges of acceptable orientations (15 degrees for each of the four orientations), with relatively large "dead zones" (75 degrees each). Such an arrangement tolerates only a limited degree of degeneracy in posture, but still does not require perfect precision in postures being delivered as inputs.

The arrangements shown in FIG. 6A through FIG. 6D illustrate certain examples of degrees of degeneracy as may be acceptable in various conditions. Thus with regard to postures being oriented substantially upward, substantially to the right, substantially along an axis, etc., it should be understood that the degree of precision may vary considerably from one embodiment to another. While absolute precision may not be required, neither is any particular range of variation necessarily required or prohibited. So long as a determination may be made successfully regarding whether given postures are indeed oriented right, left, up, down, etc., the degree of precision is not limited. In addition, it is emphasized that the arrangements in FIG. 6A through FIG. 6D are examples only, and other arrangements may be equally suitable.

Turning now to FIG. 7A through FIG. 7E, tolerance for at least some degree of degeneracy in poses also may be suitable. That is, not only the hand orientation (with respect to postures) but also the hand configuration (e.g. where the digits are in relation to one another, whether the digits are curled or extended, etc.) may be subject to some degree of degeneracy, and varying degrees of degeneracy may be accepted or rejected in various embodiments.

Figure 7A:
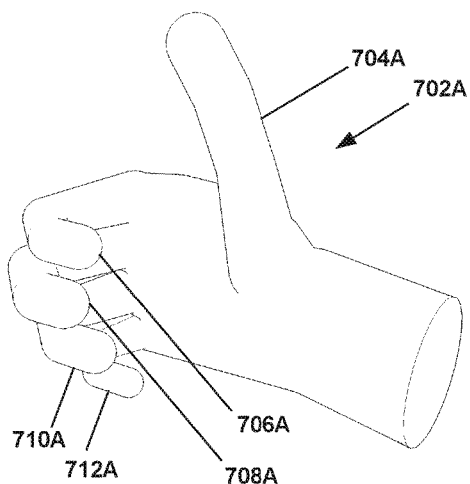
FIG. 7A through FIG. 7E show examples of degeneracy of pose, in perspective view.

With reference specifically to FIG. 7A, therein is shown a hand 702A. As may be seen, the thumb 704A is substantially extended, and the fingers 706A, 708A, 710A, and 712A are curled. Broadly speaking, the hand 702A may appear to be in a thumb extended pose (and a thumb up posture, though variations in orientation are not discussed with regard to FIG. 7A through FIG. 7D). However, as may be seen from a comparison of FIG. 7A with FIG. 4C, in FIG. 7A the fingers 706A, 708A, 710A, and 712A are not curled as tightly as in FIG. 4C. More colloquially, the pose in FIG. 7A might be described as more "loose" than that in FIG. 4C.

Figure 7B:
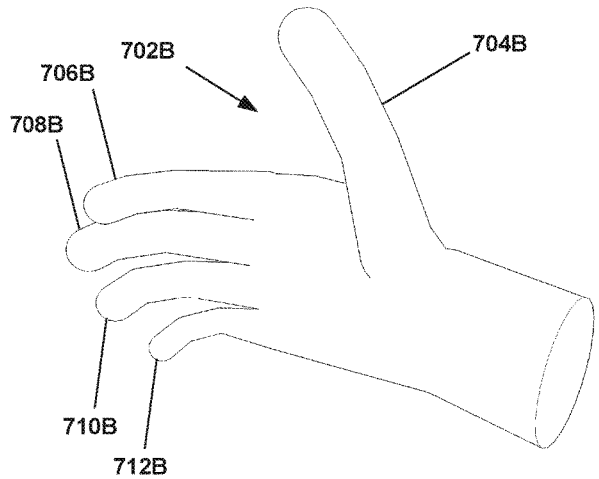
Figure 7C:
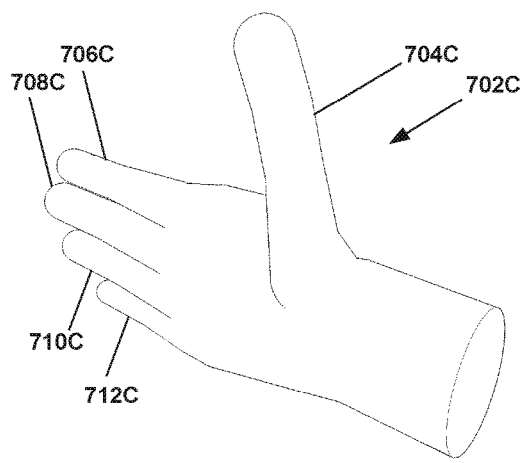
Figure 7D:
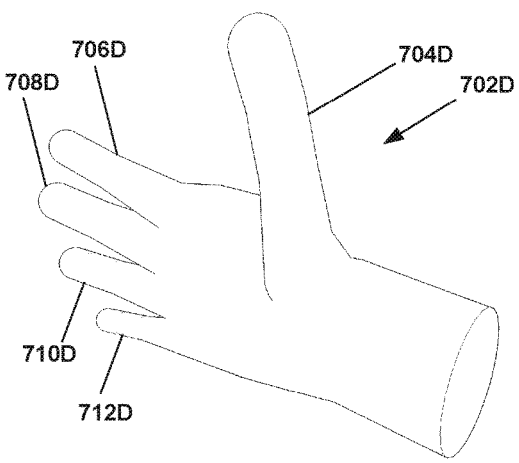
Figure 7E:
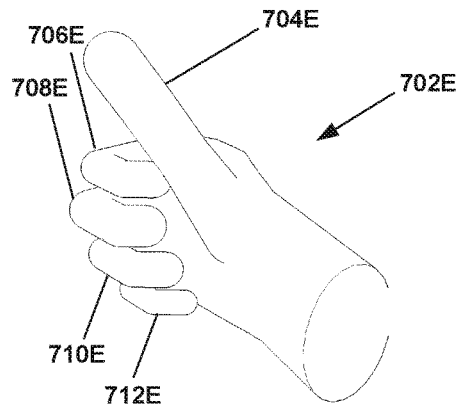

In FIG. 7B a hand 702B is shown with the thumb 704B substantially extended and the fingers 706B, 708B, 710B, and 712B slightly curled. It may be noted that the thumb 704B in FIG. 7B also is less vertical than (for example) in FIG. 7A, being disposed slightly more forward. In FIG. 7C a hand 702C is shown with the thumb 704C substantially extended and the fingers 706C, 708C, 710C, and 712C also extended. In FIG. 7D a hand 702D is shown with the thumb 704D substantially extended and the fingers 706D, 708D, 710D, and 712D extended and slightly spread. In FIG. 7E a hand 702E is shown with the thumb 704E only partially extended (exhibiting a straight appearance but being inclined forward and to the left), while the fingers 706E, 708E, 710E, and 712E are curled.

As with degeneracy in posture (previously described), degeneracy in pose may manifest for a variety of reasons, such as user error, variations in user preferences (e.g. what a given user considers to be "the right way to make a thumbs up"), variations in user anatomy, artifacts from sensors and/or processing techniques, etc. As with posture degeneracy, it may be useful to allow for some degree of pose degeneracy, though the exact degree is not limited and may vary from one embodiment to another.

Thus, the arrangements in FIG. 7A through FIG. 7D may be considered to exhibit various degrees and/or types of degeneracy, e.g. primarily with regard to the configuration of the fingers of hands 702A, 702B, 702C, 702D, and 702E therein. The degree to which degeneracy is acceptable—which in some sense may be the degree to which a hand is "substantially" exhibiting a particular ideal pose—may vary considerably. In some embodiments, little or no degeneracy may be tolerated, such that none of hands 702A, 702B, 702C, 702D, and 702E would be considered to be exhibiting a thumb-extended pose. In other embodiments, some degree of finger curl may be required, such that hands 702A, 702B, and 702E may be considered as exhibiting a thumb-extended pose, but hands 702C and 702D would not be (being too degenerate). In yet other embodiments, even hand 702C, with fingers fully extended, and/or hand 702D, with fingers not only extended but also spread, may be considered as exhibiting a thumb-extended pose. In still other embodiments, insufficient or absent finger curl in hands 702A, 702B, 702C, and 702D may result in those hands not being accepted as thumb-extended poses, even if significant inclination of the thumb as in hand 702E (or other properties such as lack of extension of the thumb, etc.) is still accepted as a thumb-extended pose.

The particulars regarding acceptable pose degeneracy, like the particulars of how a pose is defined in the first place, may vary considerably. As an extreme case, a pose may be required to be highly precise, exhibiting little or even no detectable degeneracy from some ideal standard. Such an arrangement may facilitate discrimination between poses and non-inputs (e.g. by ignoring anything that is not a highly precise pose).

However, an input standard for a posture including a thumb-extended pose also may tolerate a high degree of degeneracy. As a different extreme case an input standard may be established such that so long as the thumb is distinguishable as being separate from the remainder of the hand, the thumb extended-pose is being exhibited. In such case, whether the fingers are curled or extended, together or spread, the degree to which the thumb is extended or upright, etc. may be ignored so long as the thumb itself is distinct from the rest of the hand. Such an arrangement may facilitate ease of user interaction (e.g. by allowing for "casual" use without requiring a user to pay attention to making highly precise inputs).

Depending on circumstances, different ranges of degeneracy, different factors of degeneracy (e.g. finger curl, finger spread, thumb extension, thumb alignment, etc.), and other variations may be suitable. The preceding are examples only, and should not be considered limiting.

Figure 8A:
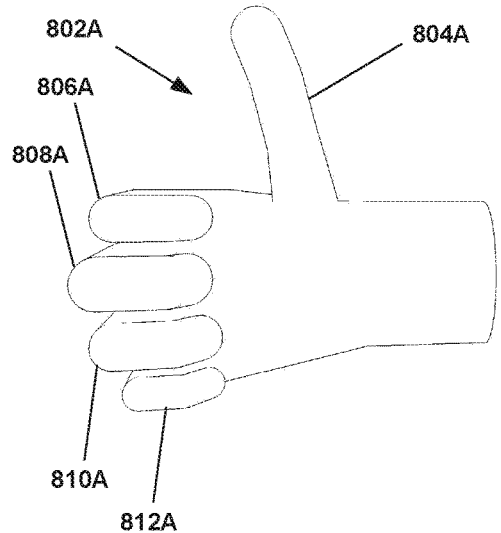
FIG. 8A and FIG. 8B show example variations of postures as may be considered for input, in perspective view.
Figure 8B:
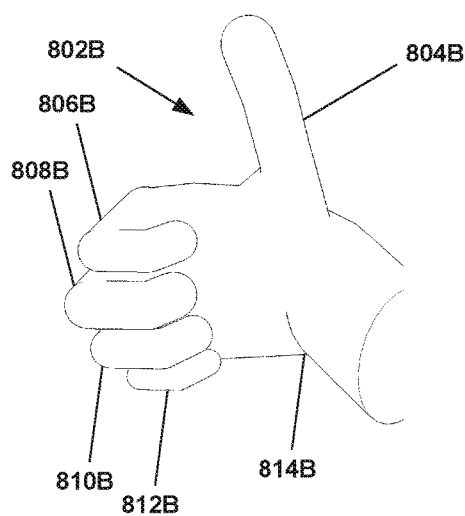

Now with regard to FIG. 8A and FIG. 8B, thus far certain examples of poses and postures shown thus far have been relatively simple. For example, certain poses have been described addressing mainly the curl/extension and alignment of digits, while certain postures have been described addressing only orientation within a plane (e.g. right, left, up, down). However, other factors may be considered in defining postures and/or poses.

For example, referring to FIG. 8A orientation other than that of a primary indicator may be considered. That is, for certain previous examples regarding postures based on a thumb extended pose, only the direction in which the thumb points may have been considered. However, hands (and other input sources) may not be limited only to such simple orientations, and thus other factors may be considered regarding postures.

As seen in FIG. 8A, a hand 802A is shown, with the thumb 804A extended and the fingers 806A, 808A, 810A, and 812A curled. Thus the hand 802A may reasonably be considered to be a thumb-extended pose. In addition, as may be seen, the thumb 804A is oriented upward, so by at least some definitions the hand 802A may be considered to be a thumb-up posture. However, as may be seen the arrangement in FIG. 8A differs from certain previous examples of thumb-up postures, such as shown in FIG. 4C. In FIG. 4C, the hand is viewed from behind and somewhat to the left, as may be anticipated if the hand were viewed from a perspective corresponding with the head of a user if the hand were extended in front of the user. By contrast, in FIG. 8A the hand is viewed from the palm side. An arrangement such as in FIG. 8A may be anticipated if the hand were held in front of a head-mounted sensor, extending in from the right (e.g. with the elbow bent).

Depending on the embodiment, it may be suitable to simply consider an arrangement such as shown in FIG. 8A as a thumb-up posture, functionally equivalent to that in FIG. 4C. That is, the only orientation factor considered would be where the thumb points. However, it also may suitable in other embodiments to consider factors of hand orientation other than only the direction of the thumb. Thus, depending on the embodiment, the hand 804A in FIG. 8A may be considered to be a thumb-up posture equivalent to that in FIG. 4C, or the hand 804A may be considered to be a different posture (given that the hand is arranged with fingers generally to the left in FIG. 8A, as opposed to generally forward in FIG. 4C).

Alternately, the arrangement shown in FIG. 8A may for certain embodiments be considered as a form of degeneracy, i.e. in that the arm is not in an ideal anticipated position/orientation for a given pose and/or posture. Classifying the arrangement of FIG. 8A as degeneracy, and variations in the degree of such degeneracy accepted, may be suitable for certain embodiments.

Consequently, the arrangement in FIG. 8A may or may not be considered as a thumb-up posture, and/or may or may not be considered as a distinctly different posture (potentially invoking different control functions). Either option is acceptable for certain embodiments, and other arrangements also may be suitable.

Turning to FIG. 8B, another option is also presented with regard to pose and/or posture. As may be seen, a hand 802B is shown, with the thumb 804B extended and the fingers 806B, 808B, 810B, and 812B curled. Thus the hand 802B again may reasonably be considered to be a thumb-extended pose. The thumb 804B is oriented upward, so by at least some definitions the hand 802B also may be considered to be a thumb-up posture. However, the arrangement in FIG. 8A differs from certain previous examples of thumb-up postures in that a wrist 814B is shown to be bent, turning the hand 802B to the left.

Again, it may be suitable to simply consider FIG. 8B to show a thumb-up posture, functionally equivalent to that in FIG. 4C. However, it also may suitable in to consider the bend in the wrist 814B with regard to pose and/or posture. For example, the hand 80BA in FIG. 8B may be considered to be a thumb-up posture equivalent to that in FIG. 4C, or the hand 804B may be considered to be a different posture (given that the hand is arranged with fingers generally to the left in FIG. 8A, as opposed to generally forward in FIG. 4C). The hand 804B may even be considered to be a different pose, if the wrist is considered to be part of the hand (which may be permitted, but is not required).

Alternately, the arrangement shown in FIG. 8B may be considered a form of degeneracy. Classifying the arrangement of FIG. 8B as degeneracy, and variations in the degree of such degeneracy accepted, may be suitable for certain embodiments.

Thus the arrangement in FIG. 8B also may or may not be considered as a thumb-up posture, and/or may or may not be considered as a distinctly different posture (potentially invoking different control functions). Either option is acceptable for certain embodiments, and other arrangements also may be suitable.

Broadly speaking, the arrangements in FIG. 8A and FIG. 8B may be considered to represent additional degrees of freedom. That is, in addition to finger and thumb configuration and thumb orientation, overall hand orientation, wrist position, etc. may be considered with regard to poses and/or postures. Other degrees of freedom besides those specifically shown and described also may be considered. While such additional considerations are not required, neither are they prohibited, and the degrees of freedom to be considered for poses and/or postures is not limited unless otherwise specified.

In addition, it should be understood that what is considered to be a pose and a posture may vary. For example, if the hand is considered not to include the wrist, then bending the wrist may be considered to affect posture (by changing the orientation of the hand) but not pose (since bending the wrist does not define how the digits are disposed). However, if the wrist is also considered to be part of the hand, then bending the wrist may represent part of the pose. Similarly, in it may be possible to consider an arm with forearm, elbow, etc., with the configuration of the entire arm and hand defining the pose. In principle it may even be possible to define pose with regard to an entire body, with posture then relating to the orientation and/or position of that body in space. In practice it may prove convenient to consider only the hand, potentially but not necessarily including the wrist, as the "actor" for defining poses. However, such a definition is to some degree arbitrary, and other arrangements also may be suitable.

Figure 9A:
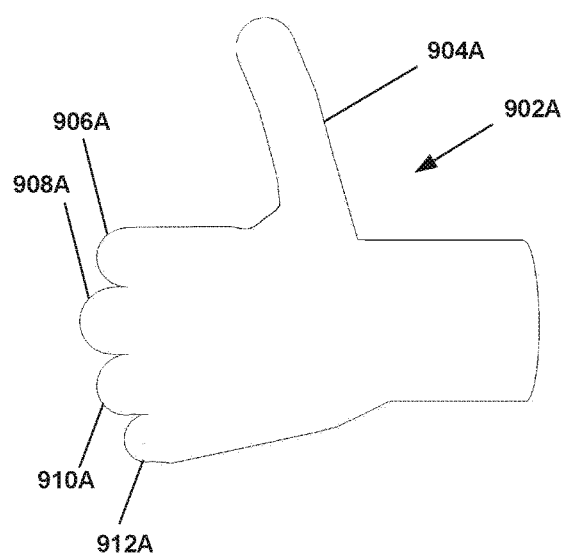
FIG. 9A and FIG. 9B show example variations of postures as may be rejected for input, in perspective view.
Figure 9B:
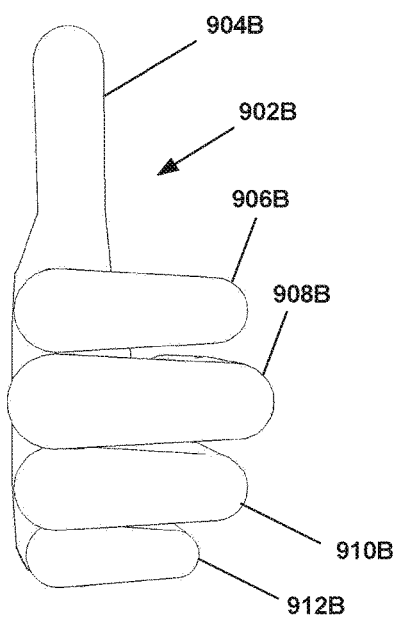

Now with regard to FIG. 9A and FIG. 9B, it is noted that while a wide variation of poses and/or postures may be considered, it is not required that all theoretically possible poses or postures be considered. Certain inputs may be excluded, based for example on concerns such as anatomical improbability.

In FIG. 9A, a hand 902A is shown with the thumb 904A extended and the fingers 906A, 908A, 910A, and 912A curled. Thus by a strict definition the hand 902A could be considered to be a thumb-extended pose. The thumb 904A is oriented upward, so by at least some definitions the hand 902A also could be considered to be a thumb-up posture.

Also, in FIG. 9B a hand 902B is shown with the thumb 904B extended and the fingers 906B, 908B, 910B, and 912B curled. Again by a strict definition the hand 902B could be considered to be a thumb-extended pose. The thumb 904B is oriented upward, so again by at least some definitions the hand 902B also could be considered to be a thumb-up posture.

However, the orientation of the hands 902A and 902B with regard to the point of view is noted. Namely, the hand 902A is viewed from the back, while the hand 902B is viewed knuckles-on. For certain arrangements, such as a sensor disposed on a user's head (e.g. on a head mounted display), it may be concluded that the hands 902A and/or 902B may be unlikely to belong to the user. Consider the possibilities of arranging one's own right hand with the thumb up but the with back of the hand facing one's eyes, or with the thumb up but with the knuckles facing one's own eyes. Such arrangements are, if perhaps not entirely impossible for human anatomy, then at least extremely difficult. It may be more likely that such arrangements would indicate that the hands 902A and/or 902B belong to some other person, e.g. the hand of a person facing the user, rather than the hand of a person wearing the sensor itself. Thus, for at least certain embodiments it may be suitable to exclude hands such as 902A and 902B as input; even though technically the hands 902A and 902B may represent a thumb-extended pose in a thumb-up posture.

Other factors besides hand orientation also may be considered in excluding potential input. For example, factors regarding the user (e.g. known hand coloration, hand proportions, a history of making poses/postures in a certain manner, etc.) and/or other factors also may be considered in excluding certain data as inputs, even if that data otherwise conforms to general definitions for suitable poses and/or postures. However, such exclusions, while permissible, are not required.

Figure 10A:
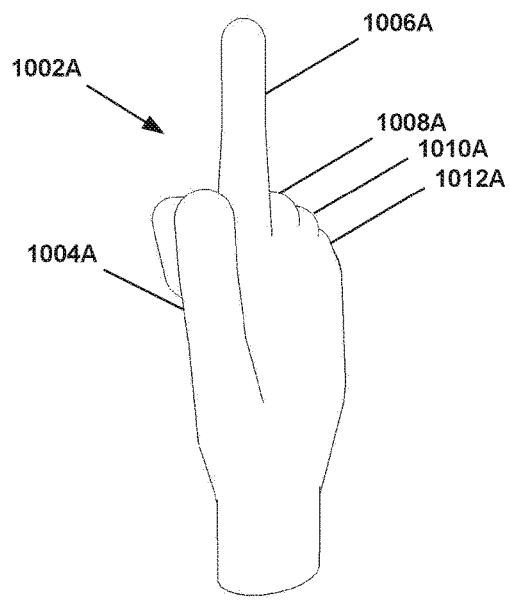
FIG. 10A through FIG. 10C show additional example poses, in perspective view.
Figure 10B:
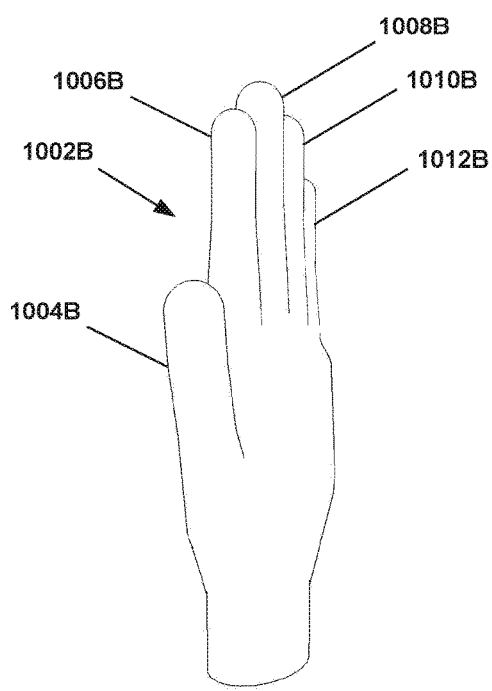
Figure 10C:
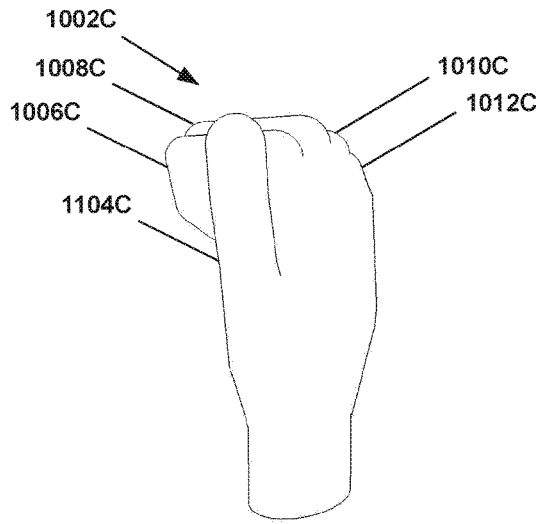

Now with reference to FIG. 10A through FIG. 10C, as has been noted, the use of a thumb-extended pose is presented as an example only, and other poses may be equally suitable. FIG. 10A through FIG. 10C show three additional examples, as may be suitable for other embodiments. These examples should not be considered to be either exhaustive or limiting; other arrangements may be equally suitable. However, it is noted that the three examples shown all may be suitable for use in the "four posture" arrangement of input, wherein a single pose may serve to invoke yes, no, forward, and back control functions (or comparable functions) depending whether that pose manifests as right, left, up, and down postures respectively. That is, finger pointing (as in FIG. 10), flat hand pointing (as in FIG. 10B), and/or first pointing (as in FIG. 10C) may serve for the four-posture arrangement of core system navigation already described herein.

Specifically with regard to FIG. 10A, a hand 1002A is shown with the index finger 1006A extended, the other fingers 1008A, 1010A, and 1012A curled, and the thumb 1004A held alongside the hand 1002A (colloquially a "pointing finger"). Considering the arrangement in FIG. 10A to be a pose, such a pose may be oriented for example in postures pointing right, left, up, and down, so as to support four-posture core navigation.

In FIG. 10B a hand 1002B is shown with the fingers 1006B, 1008B, 10108, and 1012B extended, and the thumb 1004A held alongside the hand 1002B (colloquially an "open hand"). Considering the arrangement in FIG. 10B to be a pose, such a pose also may be oriented for example in postures pointing right, left, up, and down, so as to support four-posture core navigation.

In FIG. 10C, a hand 1002C is shown with the index fingers 1006C, 1008C, 1010C, and 1012C curled and the thumb 1004C held alongside the hand 1002C (colloquially a "fist".) Considering the arrangement in FIG. 10C to be a pose, such a pose again may be oriented for example in postures pointing right, left, up, and down, so as to support four-posture core navigation.

It is emphasized that while thumb-extended, pointing-finger, flat-hand, and/or first poses may be suitable for four-posture core navigation as described herein, they are examples only and other poses also may be equally suitable. Furthermore, the specific four-posture core navigation arrangements described also are examples only, and other arrangements also may be equally suitable.

Figure 11A:
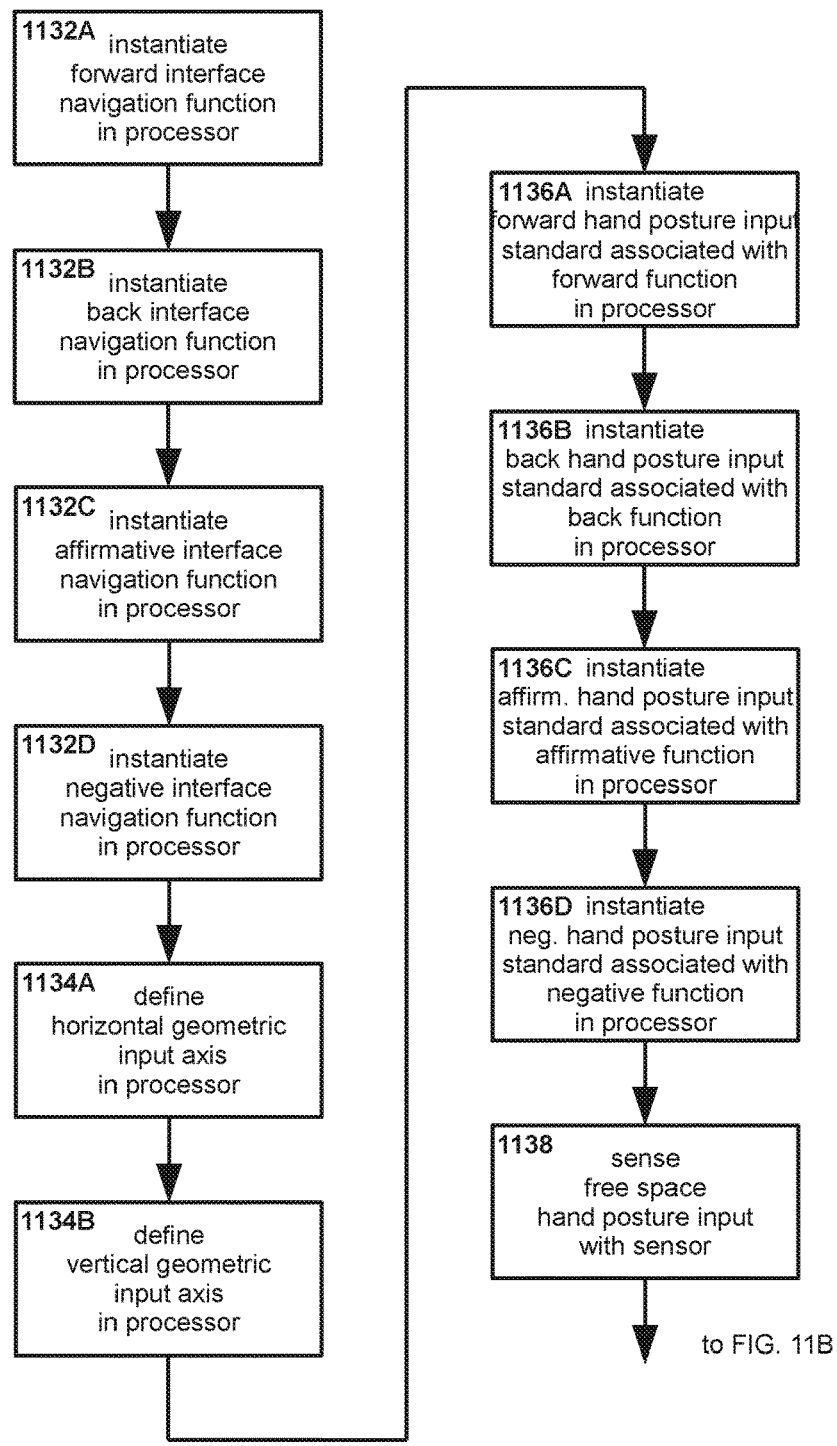
FIG. 11A and FIG. 11B show another example method for controlling a system particular to a thumb-extended hand pose with cardinal postures, in flow chart form.
Figure 11B:
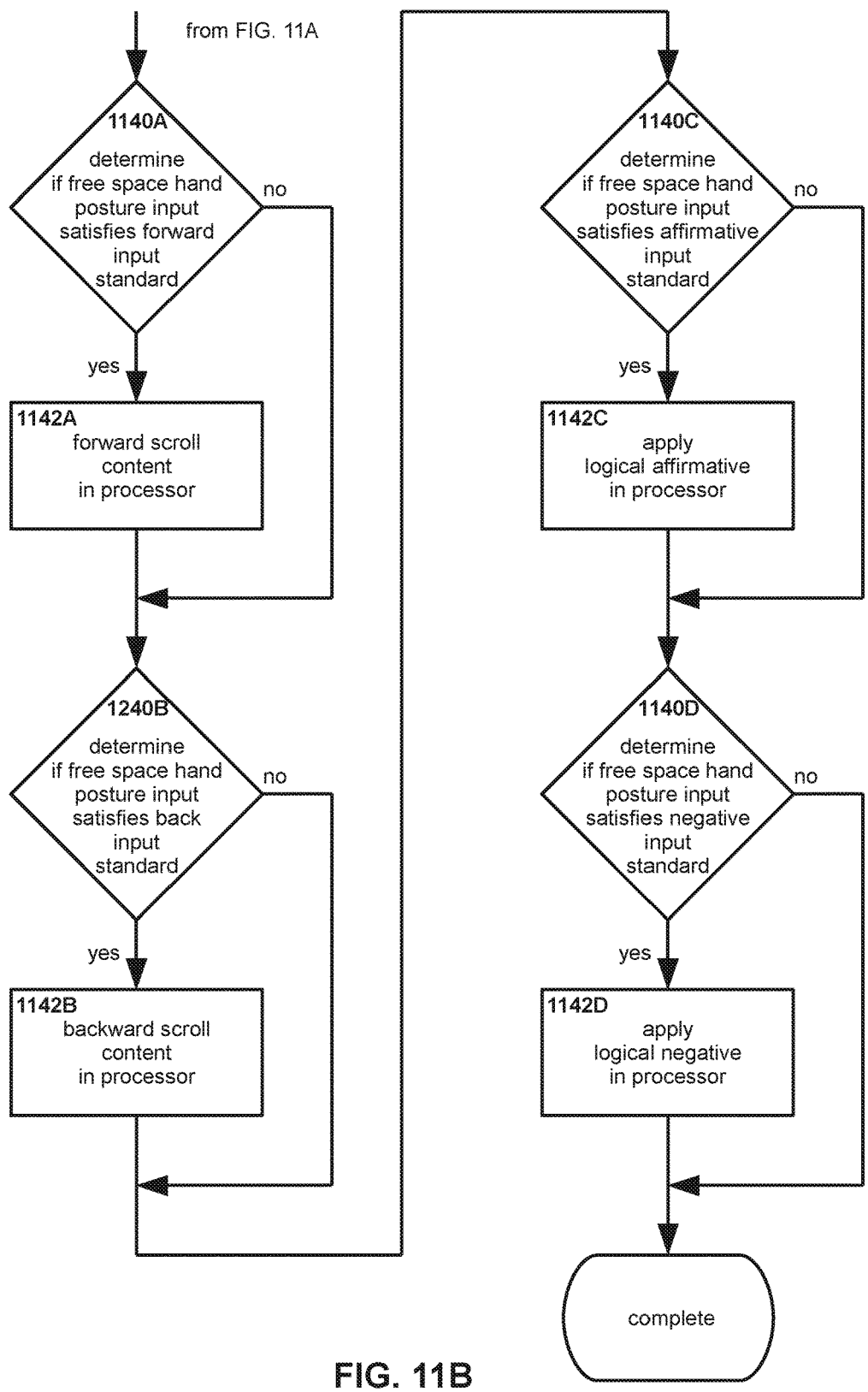

Now with reference to FIG. 11A and FIG. 11B, previously with regard to FIG. 3A and FIG. 3B an example method was shown for control using multiple postures of a single pose. The arrangement in FIG. 3A and FIG. 3B was presented as relatively general. For clarity, a FIG. 11A and FIG. 11B presents an arrangement that is at least somewhat similar, but that is directed to a more particular example.

In FIG. 11A, a forward interface navigation function is instantiated 1132A onto a processor. The forward interface navigation function invokes, commands, or otherwise causes a forward scrolling of content in an interface, a forward scrolling through content in an interface, or similar. Typically though not necessarily, the forward interface navigation function (and other navigation functions as referenced below) may be instantiated onto a processor in the form of data and/or executable instructions, as loaded from some data store such as a hard drive, solid state drive, etc.

In FIG. 11A, a forward interface navigation function is instantiated 1132A onto a processor. The forward interface navigation function invokes, commands, or otherwise causes a forward scrolling of content in an interface, a forward scrolling through content in an interface, or similar.

For example, the interface may be a graphical user interface for an electronic device, such as a head mounted display, though other arrangements may be equally suitable. Typically though not necessarily, the forward interface navigation function (and other navigation functions as referenced below) may be instantiated 1132A onto the processor in the form of data and/or executable instructions, as loaded from some data store such as a hard drive, solid state drive, etc.

A back interface navigation function also is instantiated 1132B onto the processor. The back interface navigation function invokes, commands, or otherwise causes a backward scrolling of content in an interface, a backward scrolling through content in an interface, or similar.

An affirmative interface navigation function is instantiated 1132C onto the processor. The affirmative interface navigation function invokes, commands, registers, etc. a positive logical state, i.e. "yes", within the interface. The affirmative interface navigation function thus may accept some option, indicate that some information has been received, confirm completion of an action, etc.

A negative interface navigation function is instantiated 1132D onto the processor. The negative interface navigation function invokes, commands, registers, etc. a negative logical state, i.e. "no", within the interface. The affirmative interface navigation function thus may reject some option, indicate that information has not been received, register that some task is not complete, etc.

The forward and back interface navigation functions are opposites, in that forward scrolling may be considered opposite to backward scrolling. Similarly, the affirmative and negative interface navigation functions are opposites, in that affirmative and negative logical indications may be considered opposites.

Continuing in FIG. 11A, a horizontal geometric input axis is defined 1134A in the processor. The horizontal geometric input axis serves to determine orientation of inputs to the system, e.g. "right" in one direction along the axis or "left" in an opposite direction along the axis. The horizontal geometric input axis may or may not be displayed to a user for purposes of alignment reference; such display is not required, but also is not excluded. It is noted that the horizontal geometric input axis is not necessarily required to be perfectly linear, and indeed may deviate noticeably from linear in certain embodiments. For example, a horizontal axis may be curved to accommodate human ranges of motion (e.g. approximating motion arcs for arms, etc.).

A vertical geometric input axis is defined 1134B in the processor. The vertical geometric input axis likewise serves to determine orientation of inputs to the system, e.g. "up" in one direction along the axis or "down" in an opposite direction along the axis. The vertical geometric input axis also may or may not be displayed to a user for purposes of alignment reference, and may or may not be strictly linear.

Continuing in FIG. 11A, a forward hand posture input standard is instantiated 1136A in the processor, associated with the forward interface navigation function. That is, the posture that will be accepted as "forward input" for invoking the forward interface navigation function is specified, i.e. defined as some standard. The hand posture input may for example be a single pose, that pose being shared with other hand posture input standards (as described below). As a more particular example, the forward hand posture input standard may specify a free space hand pose, with the fingers substantially together and substantially curled/clenched, and with the thumb substantially extended and substantially raised away from the hand. The forward hand posture input standard further may specify that the pose in question is in a posture oriented such that the thumb extends towards the right substantially parallel with the horizontal geometric input axis.

Some degree of degeneracy in pose and/or posture also may be defined within the forward hand posture input standard (and likewise the back, affirmative, and negative hand posture input standards). However, degeneracy ranges (if used) also may be defined elsewhere, for example some general definition that specifies allowed/rejected degeneracy or other variations from ideal inputs throughout a system, as opposed to being specific to any one pose and/or posture. Other arrangements also may be equally suitable.

A back hand posture input standard is instantiated 1136B in the processor, associated with the back interface navigation function. The posture accepted as "back input" for invoking the back interface navigation function is specified, i.e. defined as some standard. The back hand posture input standard may specify the free space hand pose referenced with regard to 1136A, and may further specify a posture oriented such that the thumb extends towards the left substantially parallel with the horizontal geometric input axis.

An affirmative hand posture input standard is instantiated 1136C in the processor, associated with the affirmative interface navigation function. The posture accepted as "affirmative input" for invoking the affirmative interface navigation function is specified, i.e. defined as some standard. The affirmative hand posture input standard may specify the free space hand pose referenced with regard to 1136A, and may further specify a posture oriented such that the thumb extends upward substantially parallel with the vertical geometric input axis.

A negative hand posture input standard is instantiated 1136D in the processor, associated with the negative interface navigation function. The posture accepted as "negative input" for invoking the negative interface navigation function is specified, i.e. defined as some standard. The negative hand posture input standard may specify the free space hand pose referenced with regard to 1136A, and may further specify a posture oriented such that the thumb extends downward substantially parallel with the vertical geometric input axis.

Still with reference to FIG. 11A, a free space hand posture input is sensed 1138 by a sensor in communication with the processor. For example, continuing the example of a head mounted display, a depth camera, RGB camera, or other sensor may image the hand of a user wearing the head mounted display, so as to acquire data regarding what pose and/or posture (if any) the user is exhibiting.

Moving on to FIG. 11B, a determination is made 1140A in the processor as to whether the free space hand posture input meets the forward hand posture input standard. That is, does the free space hand posture input as sensed in 1138 meet whatever criteria are part of the forward hand posture input standard as instantiated 1136A on the processor? To continue the example above, does the free space hand posture input reveal a hand in a thumb extended pose with the thumb oriented to the right?

If the determination 1140A is positive, the method continues with step 1142A. In step 1142A, the forward interface navigation function is executed in the processor, such that content is forward scrolled 1142A in the navigation interface. If the determination 1140A is negative, the method skips step 1142A and continues with step 1140B.

Continuing in FIG. 11B, a determination is made 1140B in the processor as to whether the free space hand posture input meets the back hand posture input standard. That is, does the free space hand posture input as sensed in 1138 meet whatever criteria are part of the forward hand posture input standard as instantiated 1136B on the processor? To continue the example above, does the free space hand posture input reveal a hand in a thumb extended pose with the thumb oriented to the left? If the determination 1140B is positive, the method continues with step 1142B. In step 1142B, the back interface navigation function is executed in the processor, such that content is backward scrolled 1142B in the navigation interface. If the determination 1140B is negative, the method skips step 1142B and continues with step 1140C.

A determination is made 1140C in the processor as to whether the free space hand posture input meets the affirmative hand posture input standard. That is, does the free space hand posture input as sensed in 1138 meet whatever criteria are part of the affirmative hand posture input standard as instantiated 1136C on the processor? To continue the example above, does the free space hand posture input reveal a hand in a thumb extended pose with the thumb oriented up? If the determination 1140C is positive, the method continues with step 1142C. In step 1142C, the affirmative interface navigation function is executed in the processor, such that an affirmative logical state is entered 1142C within the navigation interface. If the determination 1140C is negative, the method skips step 1142C and continues with step 1140D.

A determination is made 1140D in the processor as to whether the free space hand posture input meets the negative hand posture input standard. That is, does the free space hand posture input as sensed in 1138 meet whatever criteria are part of the negative hand posture input standard as instantiated 1136D on the processor? To continue the example above, does the free space hand posture input reveal a hand in a thumb extended pose with the thumb oriented down? If the determination 1140D is positive, the method continues with step 1142D. In step 1142D, the negative interface navigation function is executed in the processor, such that a negative logical state is entered 1142D within the navigation interface. If the determination 1140D is negative, the method skips step 1142D.

It is particularly noted that in scrolling forward or back, delivering affirmative, or negatives, as in steps 1142A, 1142B, 1142C, and 1142D, other actions also may be implied. For example, if the interface is a graphical user interface, then any or all of steps 1142A, 1142B, 1142C, and 1142D may result in visible changes to displayed content, and/or other noticeable changes. Although executing the functions 1142A, 1142B, 1142C, and 1142D refer directly to system control through navigation, system control and/or navigation are not required to be invisible or otherwise unnoticeable, and indeed system control and/or interface navigation may have readily perceived effects. To continue the example of a head mounted display, there may be changes to what is displayed thereon, new programs may be activated, hardware systems may be turned on or off, communications may be sent or received, etc. Specific graphical or other visible changes are not specified herein, as embodiments are not limited with regard to what changes may be made or to what degree a system may be controlled; in practice the range of potential control responses is extremely large and varied. Regardless, although navigation is referred to herein at times with regard to the somewhat abstract notion of "an interface", in practice navigation and/or other control functions may in fact control systems, mechanisms, etc. that are practical and/or physical.

Figure 12:
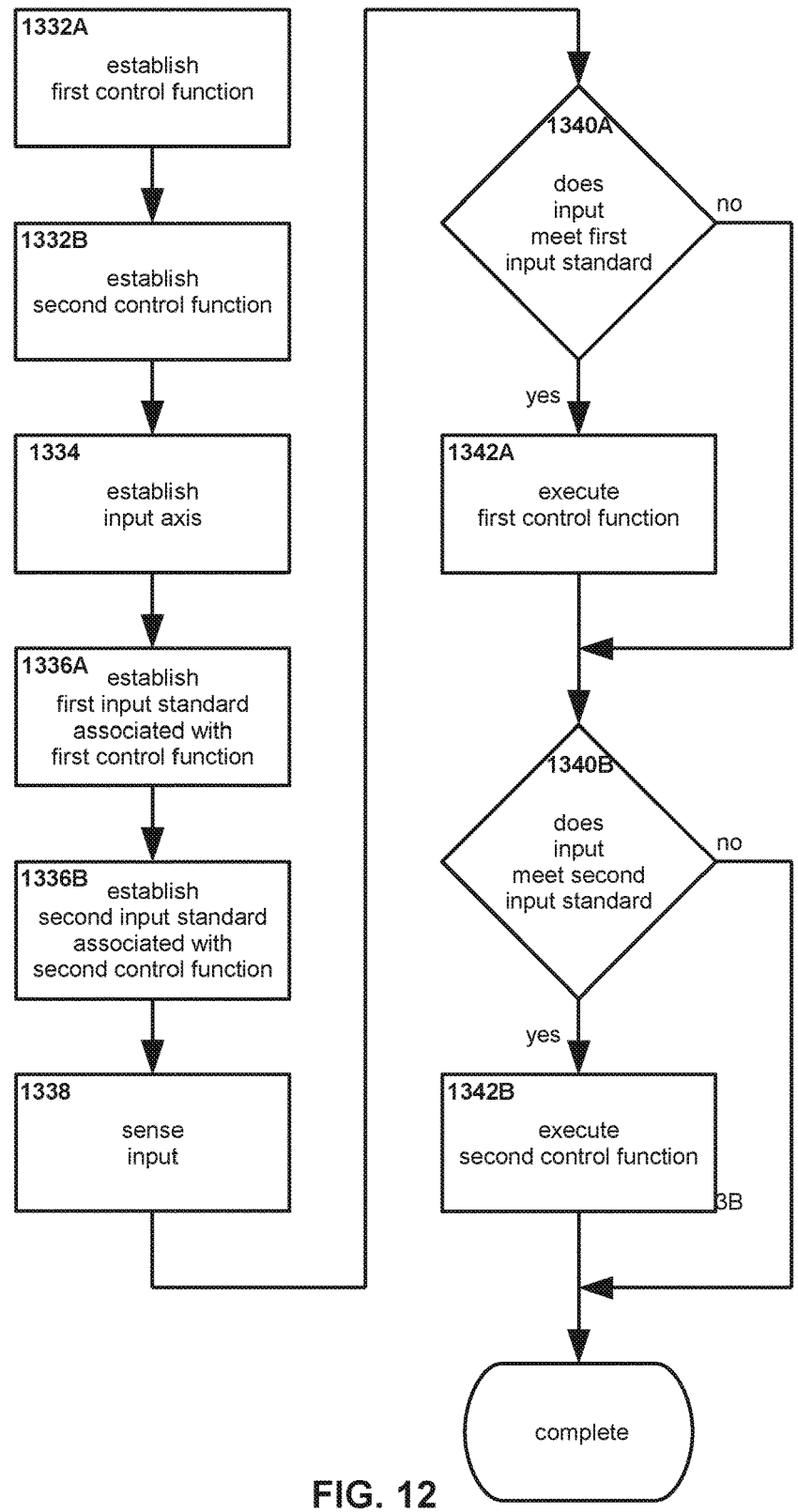
FIG. 12 show another example method for controlling a system particular to a thumb-extended hand pose with a pair of opposed postures, in flow chart form.
Figure 13:
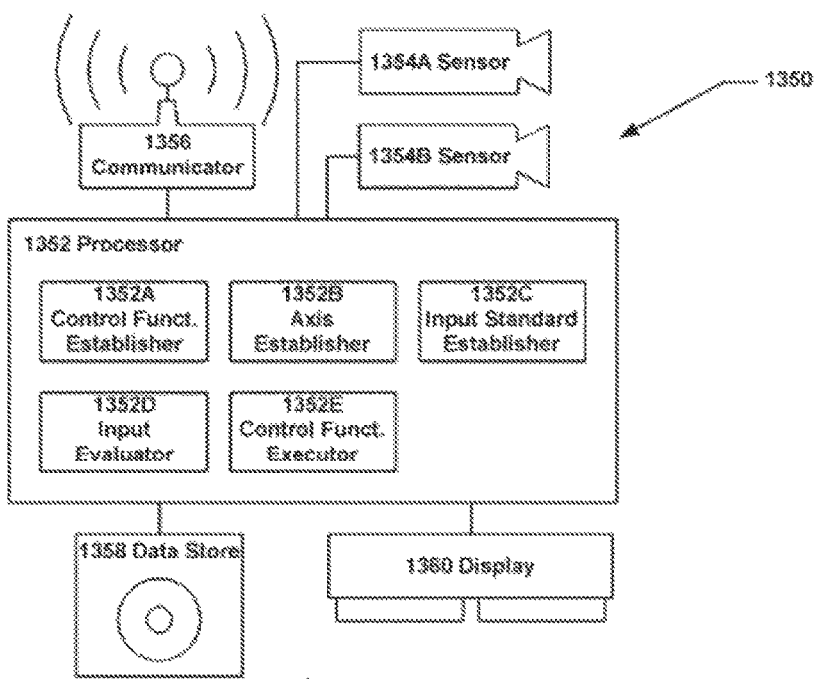
FIG. 13 shows an example apparatus for controlling a system, in schematic view.

Now with reference to FIG. 12, although as noted previously it may be useful to support navigation with four functions along two axes (e.g. yes/no and forward/back), as also noted such an arrangement is not necessarily limiting. For example, for certain embodiments it may be suitable to utilize only a single axis, such as a forward/back axis. FIG. 13 shows an example arrangement for control using multiple postures of a single pose.

In FIG. 12, a first control function is established 1232A. For example, the first control function established 1232A may be a forward navigational command in a processor. Control functions have been previously described herein (e.g. with regard to FIG. 3A and FIG. 3B). A second control function also is established 1232B. For example, the second control function established 1232B may be a back navigational command in a processor.

An input axis is established 1234. The input axis may for example be a horizontal spatial axis presents the possibility of options to the right or to the left (though other arrangements also may be suitable). Input axes also have been previously described herein.

Continuing in FIG. 3A, a first input standard is established 1236A, associated with the first control function. A second input standard also is established 1236B, associated with the second control function. For example, the first input standard may specify a free space hand input exhibiting a thumb-extended pose, in a posture with the thumb aligned to the right along the input axis. The second input standard may specify a free space hand input exhibiting a thumb-extended pose, in a posture with the thumb aligned to the left along the input axis.

Input is then sensed 1238. Input may be, but is not required to be, the pose and/or postures specified with the first and second input standards.

Still with reference to FIG. 12, a determination is made 1240A as to whether the input meets the first input standard. If the determination 1240A is positive then the method continues with step 1242A, wherein the first control function is executed (e.g., forward scrolling of/in content in an interface). If the determination 1240A is negative, then the method skips step 1242A and continues with step 1240B.

A determination is made 1240B as to whether the input meets the second input standard. If the determination 1240B is positive then the method continues with step 1242B, wherein the second control function is executed (e.g, backward scrolling of/in content in an interface). If the determination 1240B is negative, then the method skips step 1242B.

Although the arrangement shown in FIG. 12 is described with regard to forward and backward control functions, it should be understood that a similar arrangement could be made using affirmative and negative control functions, and/or other control functions or pairs thereof.

Now with reference to FIG. 13, therein is shown an example embodiment of an apparatus for controlling a system, in schematic form.

In the example arrangement of FIG. 13, the apparatus 1350 includes a processor 1350, with at least one sensor in communication therewith; in the arrangement shown in FIG. 13 there are two sensors 1354A and 1354B, but this is an example only and not all embodiments require or will necessarily have more than one sensor.

The processor 1352 is adapted to execute executable instructions instantiated thereon. The choice of processor 1352 is not limited. Suitable processors 1352 include but are not limited to digital electronic microprocessors. Although the processor 1352 is referred to in at least some places herein as a self-contained physical device for purposes of clarity, this is not required, and other arrangements may be suitable. For example, the processor 1352 may constitute two or more physical processors working cooperatively, a processing capability in a network without a well-defined physical form, etc.

The sensors 1354A and 1354B are adapted to sense input, for example (but not necessarily only) free space input such as hand postures. As shown in FIG. 13, the sensors 1354A and 1354B are depicted as imagers, such as a color digital camera, depth camera, pair of stereo cameras, etc. However, these are examples only, and embodiments are not limited with regard to what sensors may be utilized therein. Suitable sensors may include, but are not limited to, digital and/or analog cameras (whether operating in grayscale and/or color, and whether sensing visible light, infrared light, thermal radiation, and/or ultraviolet light) depth cameras, structured light sensors, time-of-flight sensors, and ultrasonic sensors.

The sensor(s) 1354A and 1354B are in communication with the processor 1352. As shown, the sensors 1354A and 1354B are illustrated directly connected with the processor 1352, but this is an example only. Other arrangements may be equally suitable, including but not limited to arrangements wherein one or more sensors are not part of the apparatus 1350 at all, and/or wherein a sensor is physically distant from the apparatus 1350. So long as suitable data may be obtained for determining the presence of input, embodiments are not limited with regard to sensors. In addition, embodiments are not limited with regard to how the processor 1352 and sensors 1354A and 1354B may be in communication. Although a hard wired link may be suitable as shown in FIG. 13, other arrangements, including but not limited to wireless communication may be equally suitable.

As may be seen, the arrangement of FIG. 13 includes several data entities 1352A through 1352E disposed on the processor 1352. Data entities 1352A through 1352E are functional constructs, for example of data and/or executable instructions instantiated onto a processor. The data entities 1352A through 1352E as shown in FIG. 13 are adapted to enable certain functions by/on the processor 1352. However, the use of data entities as shown is an example only; comparable functional entities other than data entities also may be suitable. For example, the functions for the data entities 1352A through 1352E (described below) could be carried out by hardwired electronics, or potentially even by mechanical systems or other systems. So long as the specified functionality is present, the particular nature of the data entities 1352A through 1352E (or even whether the functions are carried out by data entities per se) is not limiting.

Still with reference to FIG. 13, the data entities as shown therein are a control function establisher 1352A, an axis establisher 1352B, an input standard establisher 1352C, an input evaluator 1352D, and a control function executor 1352E.

The control function establisher 1352A is adapted to establish control functions on the processor. For example, the control function establisher 1352A may establish first, second, third, and fourth control functions on the processor, those control functions including a positive parameter progression, a negative parameter progression, a first logical binary state, and a second logical binary state. As a more specific example, the control functions may include a forward content scroll, a backward content scroll, a logical affirmative, and a logical negative. However, the particulars of the control functions are not limited, and other arrangements may be equally suitable.

In addition, the manner by which the control functions are established by the control function establisher 1352A is not limited. In certain embodiments, the control function establisher may generate (e.g. procedurally through the use of executable instructions) the various control functions. However, the control functions alternatively may be read from stored information (e.g. a data store), or the control functions themselves may be present within the control function establisher 1352A itself. Similar variability may apply to the nature and/or function of the axis establisher 1352B, input standard establisher 1352C, input evaluator 1352D, and control function executor 1352E.

Again in reference to FIG. 13, the axis establisher 1352B is adapted to establish first and second direction axes, including but not limited to dimensional axes that are perpendicular to one another such as a vertical axis and a horizontal axis.

The input standard establisher 1352C is adapted to establish first, second, third, and fourth input standards, the input standards being associated with the first, second, third, and fourth control functions respectively. Typically though not necessarily, input standard establisher 1352C is adapted to establish the first, second, third, and fourth input standards such that all specify the same pose, oriented in different directions (e.g. along first and second axes) so as to form a distinct posture for each of the first, second third and fourth input standards.

The input evaluator 1352D is adapted to evaluate input as received by the sensors 1354A and 1354B (or in embodiments with only one, the sensor singular) so as to determine whether the input satisfies any of the first, second third, and fourth input standards. Typically though not necessarily, this may be accomplished by performing actions such as (but not limited to) analyzing the data received from the sensors 1354A and 1354B computationally, constructing a model of the input (e.g. a hand model), comparing data, computations, and or models against specified values and/or models in the various input standards, etc. However, other arrangements may be equally suitable.

The control function executor 1352E is adapted to execute the first, second, third, and fourth control functions (as established by the control function establisher 1352A), in the event that input satisfies the first, second, third, or fourth input standard respectively. Typically though not necessarily the control function executor 1352E may execute an indicated control function by issuing processor commands, activating executable processor instructions, etc., but other arrangements may be equally suitable.

In addition, a number of optional elements are shown in FIG. 13. The apparatus 1350 as shown does not require such additional elements, but neither are additional elements prohibited, and certain such additional elements may be useful and/or desirable for at least certain embodiments.

A communicator 1356 is shown in communication with the processor 1352, adapted to communicate between the processor and other entities. Where a communicator 1356 is present, embodiments are not limited with regard to the communicator 1356. Typically though not necessarily a communicator 1356 may be a wireless communicator, such as a Wi-Fi or Bluetooth communicator, but other arrangements may be equally suitable. It is noted that a communicator may serve to accept data entities, executable instructions, sensor information, etc. from external sources to the processor, and/or to transmit control functions from the processor to external recipients.

A data store 1358 such as a hard drive, solid state drive, etc. is shown in communication with the processor 1352. As noted previously, executable instructions, the various data entities 1352A through 1352E, and/or other information may be instantiated onto the processor from a data store. Other functions for a data store also may be equally suitable, for embodiments wherein a data store is present. Where present, embodiments are not limited with regard to what data store 1358 may be suitable; although the data store 1358 is depicted as a hard drive in FIG. 13, this is an example only and other arrangements may be equally suitable.

A display 1360 is shown in FIG. 13. Although embodiments do not necessarily require a display 1360, a display 1360 as may be present in certain embodiments is shown herein as an example. For example, for control functions addressed to interface navigation, a display 1360 may serve to output the interface to a user, update that interface or show other information in response to user inputs (and control commands executed in response thereto), etc. As illustrated in FIG. 13, the display 1360 is a stereo display, with left and right screens adapted to output to the left and right eyes of a viewer. However this also is an example only. Embodiments are not limited with regard to the type of display 1360. Typically, although not necessarily, the display 1360 may be a visual display. Where present, a range of devices may be suitable for use as the display 1360, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable. Furthermore, embodiments are not limited only to the use of visual displays as a display 1360.

Figure 14:
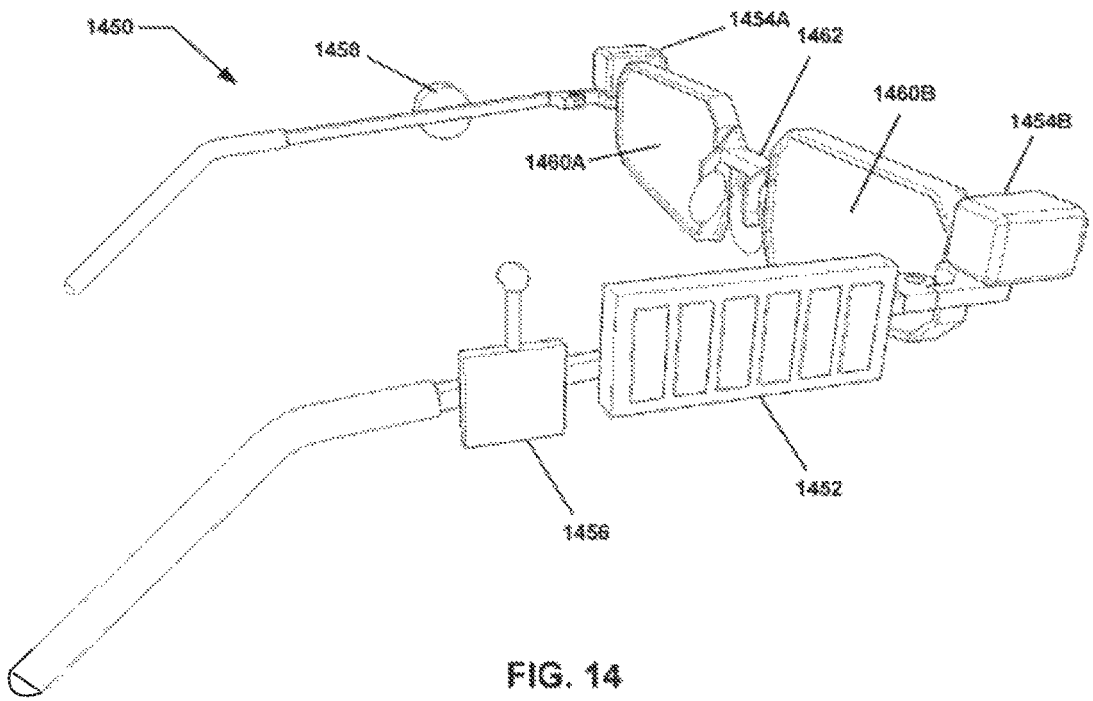
FIG. 14 shows an example embodiment of an apparatus for controlling a system, in particular a head mounted display, in perspective view.

Now with reference to FIG. 14, embodiments are not particularly limited with regard to form, and may be disposed on and/or incorporated into many shapes and/or other devices. Suitable configurations include but are not limited to the example shown in FIG. 14, which illustrates an apparatus configured in the form of a head mounted display resembling a pair of glasses.

As shown in FIG. 14, the example embodiment of the apparatus 1450 therein includes a body 1462 having a form similar to a pair of glasses, and adapted to be worn in a similar fashion. A processor 1452 adapted for executing executable instructions is disposed on the body 1462. Although not visible as distinct entities, the processor 1452 may support thereon data entities similar to those shown in FIG. 13 (such as control function establisher 1352A, axis establisher 1352B, input standard establisher 1352C, input evaluator 1352D, and/or control function executor 1352E.)

The apparatus 1450 as shown in FIG. 14 includes sensors 1454A and 1454B, both disposed on the body 1462. The apparatus also shows several features noted previously as optional, such as a communicator 1456, a data store 1458, and displays 1460A and 1460B, disposed on the body 1462. The particular arrangement and configuration of the features shown in FIG. 14 is an example only, and should not be understood as limiting.

However, as a particular example, it is noted that in the arrangement shown in FIG. 14 the body 1462 is configured and sensors 1454A and 1454B are disposed thereon such that when the body 1462 is worn by a viewer, sensors 1454A and 1454B would be substantially aligned with the lines of sight of the viewer's eyes, and could potentially encompass fields of view at least somewhat comparable to those of the viewer's eyes, assuming sensors 1454A and 1454B exhibit fields of view similar in extent to those of the viewer. (Reference is made here to the acceptance and/or rejection of certain potentially valid inputs as described with regard to FIG. 8A through FIG. 9B, based at least in part on point of view. Thus point of view for sensors detecting input may have bearing on certain functions, for at least certain embodiments.) Similarly, in the arrangement shown the body 1462 is configured and the displays 1460A and 1460B disposed thereon such that when the body 1462 is worn by a viewer, the displays 1460A and 1460B would be proximate to and substantially in front of the viewer's eyes.

However, it is emphasized that the arrangement in FIG. 14 is an example only, and that other arrangements may be equally suitable, including but not limited to other head mounted displays and devices and systems other than a head mounted display.

Figure 15:
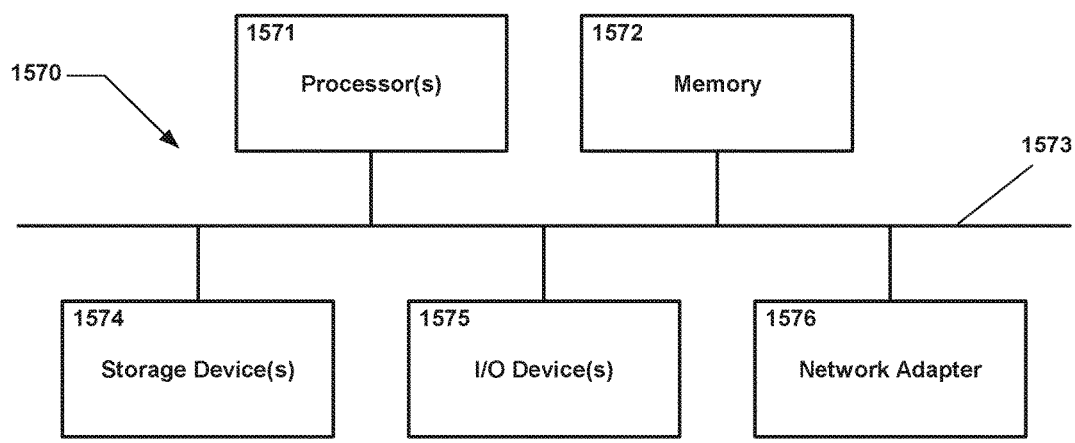
FIG. 15 shows a block diagram of a processing system that may implement certain example operations as described.

Moving on to FIG. 15, therein is shown a block diagram of an apparatus that may perform various operations, and store various information generated and/or used by such operations, according to an embodiment of the disclosed technique. The apparatus may represent any computer or processing system described herein. The processing system 1570 is a hardware device on which any of the other entities, components, or services depicted in the examples of FIG. 1 through FIG. 14 (and any other components described in this specification) may be implemented. The processing system 1570 includes one or more processors 1571 and memory 1572 coupled to an interconnect 1573. The interconnect 1573 is shown in FIG. 15 as an abstraction that represents any one or more separate physical buses, point to point connections, or both connected by appropriate bridges, adapters, or controllers. The interconnect 1573, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1571 is/are the central processing unit of the processing system 1570 and, thus, control the overall operation of the processing system 1570. In certain embodiments, the processor(s) 1571 accomplish this by executing software or firmware stored in memory 1572. The processor(s) 1571 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1572 is or includes the main memory of the processing system 1570. The memory 1572 represents any form of random access memory (RAM), read-only memory (ROM), flash memory, or the like, or a combination of such devices. In use, the memory 1572 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

The network adapter 1574, a storage device(s) 1575, and I/O device(s) 1576, are also connected to the processor(s) 1571 through the interconnect 1573 The network adapter 1574 provides the processing system 1570 with the ability to communicate with remote devices over a network and may be, for example, an Ethernet adapter or Fibre Channel adapter. The network adapter 1574 may also provide the processing system 1570 with the ability to communicate with other computers within the cluster. In some embodiments, the processing system 1570 may use more than one network adapter to deal with the communications within and outside of the cluster separately.

The I/O device(s) 1576 can include, for example, a keyboard, a mouse or other pointing device, disk drives, printers, a scanner, and other input and/or output devices, including a display device. The I/O device(s) 1576 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 1572 may be implemented as software and/or firmware to program the processor(s) 1571 to carry out actions described herein. In certain embodiments, such software or firmware may be initially provided to the processing system 1570 by downloading from a remote system through the processing system 1570 (e.g., via network adapter 1574).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 1575 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method, comprising:
   defining, by a processing device, an area in space to receive an input from a sensor for a user interface;
   defining, by the processing device, a horizontal axis in the user interface;
   defining, by the processing device, a vertical axis in the user interface;
   defining, by the processing device, a forward scrolling input associated with a forward scrolling instruction for content displayed in the user interface, wherein the forward scrolling input comprises a thumb of a hand being extended and oriented substantially rightward along the horizontal axis;
   defining, by the processing device, a back scrolling input associated with a backward scrolling instruction for the content as opposed to the forward scrolling instruction, wherein the back scrolling input comprises the thumb being extended and oriented substantially rightward along the horizontal axis;
   defining, by the processing device, an affirmative input associated with a logical affirmative instruction, wherein the affirmative input comprises the thumb being extended upward along the vertical axis;
   defining a negative input associated with a logical negative instruction opposed to the logical affirmative instruction, wherein the negative input comprises the thumb being extended downward along the vertical axis;
   sensing, by the sensor, that fingers and the thumb of the hand are located within the area of the user interface;
   sensing, by the sensor, that the fingers are together and in a clenched position;
   sensing, by the sensor, a position of the thumb relative to the horizontal axis and the vertical axis;
   in response to the fingers being together and in the clenched position, generating hand position information that only includes position information of the thumb;
   in response to the position information of the thumb indicated the thumb is in a first position associated with the forward scrolling input, executing, by the processing device, the forward scrolling instruction so as to forward scroll the content in the user interface;
   in response to the position information of the thumb indicated the thumb is in a second position associated with the back scrolling input, executing, by the processing device, the back scrolling instruction so as to backward scroll the content in the user interface;
   in response to the position information of the thumb indicated the thumb is in a third position associated with the affirmative input, executing, by the processing device, the logical affirmative instruction so as to indicate a logical affirmative; and
   in response to the position information of the thumb indicated the thumb is in a fourth position associated with the logical negative input, executing, by the processing device, the logical negative instruction so as to indicate a logical negative.

2. A machine-implemented method, comprising:
   establishing a first control function comprising a positive parameter;
   establishing a second control function comprising a negative parameter opposed to the positive parameter;

establishing a third control function comprising a first logical binary state;
establishing a fourth control function comprising a second logical binary state opposed to the first logical binary state;
establishing a first axis;
establishing a second axis;
establishing a first input standard associated with the first control function and specifying a pose disposed in a first posture oriented substantially in a first direction along the first axis;
establishing a second input standard associated with the second control function and specifying the pose disposed in a second posture oriented substantially in a second direction along the first axis;
establishing a third input standard associated with the third control function and specifying the pose disposed in a third posture substantially in a third direction along the second axis;
establishing a fourth input standard associated with the fourth control function and specifying the pose disposed in a fourth posture oriented substantially in a fourth direction along the second axis;
sensing a posture input;
in response to the posture input satisfying the first input standard, executing the first control function so as to positively progress the positive parameter;
in response to the posture input satisfying the second input standard, executing the second control function so as to negatively progress the negative parameter;
in response to the posture input satisfying the third input standard, executing the third control function so as to indicate the first logical binary state; and
in response to the posture input satisfying the fourth input standard, executing the fourth control function so as to indicate the second logical binary state.

3. The method of claim 2, wherein the positive parameter or the negative parameter is discrete.

4. The method of claim 2, wherein the positive parameter or the negative parameter is continuous.

5. The method of claim 2, wherein the positive parameter or the negative parameter comprises at least one of a spatial position, a numeric position, a magnitude, or a time.

6. The method of claim 2, wherein:
the positive parameter or the negative parameter comprises a spatial position within a continuous range of content;
the positive parameter comprises forward scrolling the content; and
the negative parameter comprises backward scrolling the content.

7. The method of claim 2, wherein:
the positive parameter or the negative parameter comprises a numeric position within a discrete range of content;
the positive parameter progression comprises forward incrementing the content; and
the negative parameter progression comprises backward incrementing the content.

8. The method of claim 2, wherein:
the first logical binary state comprises the logical affirmative instruction; and
the second logical binary state comprises the logical negative instruction.

9. The method of claim 2, wherein the horizontal axis and the vertical axis are geometric axes.

10. The method of claim 9, wherein the horizontal axis and the vertical axis are substantially perpendicular.

11. The method of claim 2, wherein the pose is a free space pose.

12. The method of claim 2, wherein the pose is a hand pose.

13. The method of claim 2, wherein:
the pose is a free space hand pose; and
the pose comprises at least one of:
the fingers together and in the clenched position and the thumb extended and raised, with a direction of the thumb defining an orientation of the pose for a posture thereof;
the fingers and the thumb together and extended, with a direction of the fingers and the thumb defining an orientation of the pose for a posture thereof;
the thumb, a middle finger, an index finger, and a pinkie finger together and in the clenched position and the index finger extended, with a direction of the index finger defining an orientation of the pose for a posture thereof; or
the fingers and the thumb together and in the clenched position to form a fist, with a direction of the first defining an orientation of the pose for a posture thereof.

14. A method, comprising:
defining, by a processing device, an area in space to receive an input from a sensor for a user interface;
defining, by the processing device, a first axis in the user interface;
defining, by the processing device, a second axis in the user interface;
defining a first control function comprising a positive parameter progression;
defining a second control function comprising a negative parameter progression opposed to the positive parameter progression;
establishing a first input standard associated with the first control function and specifying a thumb of a hand of a user disposed in a first posture oriented substantially in a first direction along the first axis;
establishing a second input standard associated with the second control function and specifying the thumb disposed in a second posture oriented substantially in a second direction along the second axis;
sensing, by the sensor, that fingers and the thumb are located within the area of the user interface;
sensing, by the sensor, that the fingers are in a first position;
sensing, by the sensor, a position of the thumb relative to the first axis and the second axis;
in response to the fingers being in the first position, generating hand position information that includes position information of only the thumb;
in response to the hand position information indicating the thumb is extending along the first axis, executing the first control function; and
in response to the hand position information indicating the thumb is extending along the first axis, executing the second control function.

15. The method of claim 14, wherein the positive parameter or the negative parameter is discrete.

16. The method of claim 14, wherein the positive parameter or the negative parameter is continuous.

17. The method of claim 14, wherein the positive parameter or the negative parameter comprises at least one of a spatial position, a numeric position, a magnitude, or a time.

18. The method of claim 14, wherein:
the positive parameter or the negative parameter comprises a spatial position within a continuous range of content;
the positive parameter progression comprises forward scrolling the content; and
the negative parameter progression comprises backward scrolling the content.

19. The method of claim 14, wherein:
the positive parameter or the negative parameter comprises a numeric position within a discrete range of content;
the positive parameter progression comprises forward incrementing the content; and
the negative parameter progression comprises backward incrementing the content.

20. The method of claim 14, wherein the first axis and the second axis are geometric axes.

21. The method of claim 14, wherein the first axis is substantially horizontal.

22. The method of claim 14, wherein the thumb is a free space pose.

23. The method of claim 14, wherein the thumb is part of a hand pose.

24. The method of claim 14, wherein the first position is a clenched position of the fingers that form a fist, with a direction of the first defining an orientation of the thumb.

25. An apparatus, comprising:
a sensor configured to sense a position of at least a portion of a hand in a defined space for a user interface;
a processor coupled to the sensor, wherein the processor is configured to:
defining an area in space to receive an input from the sensor for the user interface;
defining a first axis in the user interface;
defining a second axis in the user interface;
establish a first control function comprising a positive parameter progression;
establish a second control function comprising a negative parameter progression opposed to the positive parameter progression;
establish a third control function comprising a first logical binary state;
establish a fourth control function comprising a second logical binary state opposed to the first logical binary state;
establish a first directional axis;
establish a second directional axis;
establish a first input standard associated with the first control function and specifying a first posture of a thumb of the hand of a user oriented substantially in a first direction along the first directional axis;
establish a second input standard associated with the second control function and specifying a second posture of the thumb oriented substantially in a second direction along the first directional axis;
establish a third input standard associated with the third control function and specifying a third posture of the thumb substantially in a third direction along the second directional axis;
establish a fourth input standard associated with the fourth control function and specifying fourth posture of the thumb oriented substantially in a fourth direction along the second directional axis, wherein the sensor is configured to sense a posture of the thumb and a position of fingers of the hand;
in response to the thumb being in the first posture and the fingers being in an extended and clenched position, execute the first control function so as to positively progress the positive parameter;
in response to the thumb being in the second posture and the fingers being in the extended and clenched position, execute the second control function so as to negatively progress the negative parameter;
in response to the thumb being in the third posture and the fingers being in the extended and clenched position, execute the third control function so as to indicate the first logical binary state; and
in response to the thumb being in the fourth posture and the fingers being in the extended and clenched position, execute the fourth control function so as to indicate the second logical binary state.

26. An apparatus, comprising:
means for establishing a first control function comprising a positive parameter progression;
means for establishing a second control function comprising a negative parameter progression opposed to the positive parameter progression;
means for establishing a third control function comprising a first logical binary state;
means for establishing a fourth control function comprising a second logical binary state opposed to the first logical binary state;
means for establishing a first axis;
means for establishing a second axis;
means for establishing a first input standard associated with the first control function and specifying a first posture of a thumb of a hand of a user oriented substantially in a first direction along a first axis;
means for establishing a second input standard associated with the second control function and specifying a second posture of the thumb oriented substantially in a second direction along the first axis;
means for establishing a third input standard associated with the third control function and specifying a third posture of the thumb oriented substantially in a third direction along the second axis;
means for establishing a fourth input standard associated with the fourth control function and specifying a fourth posture of the thumb oriented substantially in a fourth direction along the second axis;
means for sensing a posture input;
in response to the thumb being in the first posture and fingers of a hand being in an extended and clenched position, means for executing the first control function so as to positively progress a parameter;
in response to the thumb being in the second posture and the fingers being in the extended and clenched position, means for executing the second control function so as to negatively progress the parameter;
in response to the thumb being in the third posture and the fingers being in the extended and clenched position, means for executing the third control function so as to indicate the first logical binary state; and
in response to the thumb being in the fourth posture and the fingers being in the extended and clenched position, means for executing the fourth control function so as to indicate the second logical binary state.

* * * * *